(12) United States Patent
Kim et al.

(10) Patent No.: US 9,696,845 B2
(45) Date of Patent: Jul. 4, 2017

(54) APPARATUS FOR DRIVING OF TOUCH PANEL

(71) Applicant: LG Display Co., Ltd., Seoul (KR)

(72) Inventors: Eun Jung Kim, Seoul (KR); Ji Eun Son, Paju-si (KR); Sung Yong Cho, Seoul (KR); Ki Seon Kim, Goyang-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 14/714,194

(22) Filed: May 15, 2015

(65) Prior Publication Data
US 2016/0062537 A1    Mar. 3, 2016

(30) Foreign Application Priority Data

Aug. 26, 2014 (KR) .................. 10-2014-0111849

(51) Int. Cl.
*G06F 3/01* (2006.01)
*G06F 3/044* (2006.01)
*G06F 3/041* (2006.01)

(52) U.S. Cl.
CPC ............ *G06F 3/0416* (2013.01); *G06F 3/016* (2013.01); *G06F 3/044* (2013.01); *G06F 3/0414* (2013.01); *G06F 2203/04106* (2013.01)

(58) Field of Classification Search
CPC ...... G06F 3/0416; G06F 3/0414; G06F 3/016; G06F 3/044; G06F 2203/04106; G06F 3/017; G06F 3/0488; G06F 3/04883
See application file for complete search history.

(56) References Cited

U.S. PATENT DOCUMENTS

2007/0097595 A1  5/2007  Radivojevic et al.
2010/0134440 A1  6/2010  Hayakawa et al.
(Continued)

FOREIGN PATENT DOCUMENTS

CN          103257740       8/2013
JP            3190754        6/1994
(Continued)

OTHER PUBLICATIONS

Extended European Search Report for European Patent Application No. EP 15170773.4, Feb. 10, 2016, 7 Pages.
(Continued)

*Primary Examiner* — Ibrahim Khan
(74) *Attorney, Agent, or Firm* — Fenwick & West LLP

(57) ABSTRACT

Embodiments relate to a touch panel operable in a first haptic mode and a second haptic mode. The touch panel includes first electrodes and second electrodes intersecting the first electrodes. The touch panel further includes an elastic dielectric member disposed between the first electrodes and the second electrodes to separate the first electrodes and the second electrodes. The first electrodes are applied with a first voltage during the first haptic mode. The second electrodes are applied with a reference voltage in the first haptic mode. A subset of the second electrodes is applied with a second voltage to generate electrostatic force between the subset of the second electrodes and a user's finger in the second haptic mode. The elastic dielectric member vibrates in response to the first voltage applied to the first electrodes in the first haptic mode.

21 Claims, 12 Drawing Sheets

(56) References Cited

U.S. PATENT DOCUMENTS

| | | |
|---|---|---|
| 2012/0075221 A1 | 3/2012 | Yasuda |
| 2012/0127088 A1* | 5/2012 | Pance .................... G06F 3/016 345/173 |
| 2012/0268386 A1* | 10/2012 | Karamath ............... G06F 3/041 345/173 |
| 2012/0287068 A1* | 11/2012 | Colgate .................. G06F 3/016 345/173 |
| 2012/0306790 A1* | 12/2012 | Kyung .................... G06F 3/016 345/173 |
| 2012/0327025 A1* | 12/2012 | Huska .................... G06F 3/016 345/174 |
| 2013/0154973 A1 | 6/2013 | Tung et al. |
| 2013/0215049 A1 | 8/2013 | Lee |
| 2013/0307789 A1* | 11/2013 | Karamath ............... G06F 3/016 345/173 |
| 2014/0015777 A1* | 1/2014 | Park ........................ G06F 3/044 345/173 |
| 2014/0139448 A1 | 5/2014 | Levesque et al. |
| 2014/0139452 A1 | 5/2014 | Levesque et al. |
| 2015/0138104 A1 | 5/2015 | Sugita |

FOREIGN PATENT DOCUMENTS

| | | |
|---|---|---|
| JP | 2007-305110 | 11/2007 |
| JP | 2012-069042 | 4/2012 |
| JP | 2012-137888 | 7/2012 |
| JP | 2014-102819 | 6/2014 |
| JP | 2014-102829 | 6/2014 |
| TW | 201032116 | 9/2010 |
| TW | 201327640 | 7/2013 |
| WO | WO 2007/029075 A1 | 3/2007 |
| WO | WO 2013/161867 A1 | 10/2013 |

OTHER PUBLICATIONS

Office Action for Japanese Patent Application No. JP 2015-148412, Aug. 23, 2016, 5 Pages, (With Concise Explanation of Relevance).

Office Action for Taiwanese Patent Application No. TW 104118020, Jun. 17, 2016, 8 Pages, (With Concise Explanation of Relevance).

* cited by examiner

APPARATUS FOR DRIVING OF TOUCH PANEL

CROSS REFERENCE TO RELATED APPLICATIONS

This application claims the benefit of the Korean Patent Application No. 10-2014-0111849 filed on Aug. 26, 2014, which is hereby incorporated by reference as if fully set forth herein.

BACKGROUND

Field of the Disclosure

Embodiments of the present invention relate to a touch panel, and more particularly, to an apparatus for driving of touch panel capable of implementing a haptic function.

Discussion of the Related Art

A touch panel is a type of input device that is included in image displaying devices such as Liquid Crystal Displays (LCDs), Field Emission Displays (FEDs), Plasma Display Panel (PDPs), Electroluminescent Displays (ELDs), Electrophoretic Display (EPDs), and Organic Light Emitting Devices (OLEDs), and allows a user to input information by pressing or touching a touch sensor of a screen with a finger, a pen or the like while a user looks at the screen of the image displaying device.

Recently, the touch panel is widely used for an input device of portable information devices such as smart phone and table PC, and also used for an input device of electronic equipment such as computer monitor, monitor and television.

According to a touch sensing method, the touch panel may be classified into a resistive type, a capacitance type, and an infrared sensing type. The capacitance touch panel has attracted great attentions owing to advantages of easy manufacturing method and good sensitivity. The capacitance touch panel may be classified into a mutual capacitance type and a self capacitance type. In comparison to the self capacitance type touch panel, the mutual capacitance type touch panel is advantageous in that it enables a multi-touch input.

In case of a general touch panel, a touch point may be sensed by the use of finger or pen. However, it is difficult to sense a touch force, that is, touch pressure. Accordingly, US Patent Application Publication Number 2014/0062933 published on Mar. 6, 2015 (hereinafter, referred to as "'933 Patent Document") discloses a capacitance touch panel which senses both touch force and touch point.

As shown in FIG. 1, in case of the capacitance touch panel disclosed in the '933 Patent Document, a touch force is sensed by a change of capacitance (Cm1) in accordance with the decrease of distance in between a pair of force sensing electrodes 12 and 22 being overlapped with each other and being parallel to each other, and a touch point is sensed by a change of capacitance (Cm2) in accordance with a fringe field in between a pair of point sensing electrodes 14 and 24 being not overlapped with each other and crossing each other.

However, the capacitance touch panel disclosed in the '933 Patent Document has the following disadvantages.

First, the force sensing electrodes 12 and 22 for sensing the touch force are separated from the point sensing electrodes 14 and 24 for sensing the touch point so that it causes a complicated electrode structure. In addition, a touch resolution is lowered due to the point sensing electrodes 14 and 24 crossing each other.

Also, efficiency of sensing the touch force is proportional to an area of the force sensing electrodes 12 and 22 facing each other. Thus, if the force sensing electrodes 12 and 22 are decreased in size so as to improve the touch resolution, the efficiency of sensing the touch force is lowered.

In order to improve the touch resolution, if the point sensing electrodes 14 and 24 are overlapped with each other, the capacitance (Cm2) formed between the point sensing electrodes 14 and 24 is maintained at a constant value without regard to a touch of conductive object, whereby the efficiency of sensing the touch point is lowered.

Meanwhile, some of image display devices including touch panels support a haptic function. The haptic function may provide the sense of touch to a user through haptic effects of changing a frictional coefficient to be sensed on a touch screen by a user. The image displaying device with the haptic function, which is the device for providing the sense of touch to a user, may include one or more haptic output device, for example, actuator. Thus, the image displaying device with the haptic function includes the additional actuator for the haptic function, whereby a structure of the device is complicated and a cost of the device is also increased.

SUMMARY

Accordingly, embodiments of the present invention are directed to an apparatus for driving of touch panel that substantially obviates one or more problems due to limitations and disadvantages of the related art, and an apparatus for driving thereof.

An aspect of embodiments of the present invention is directed to provide an apparatus for driving of touch panel capable of implementing a haptic function by the use of electrodes for a touch sensing.

Another aspect of embodiments of the present invention is directed to provide an apparatus for driving of a touch panel capable of improving both touch force sensing efficiency and touch point sensing efficiency.

In one embodiment, a touch panel includes first electrodes and second electrodes separated from and intersecting the first electrodes. The touch panel further includes an elastic dielectric member disposed between the first electrodes and the second electrodes to separate the first electrodes and the second electrodes. The first electrodes are applied with a first voltage during a first haptic mode. The second electrodes are applied with a reference voltage in the first haptic mode. A subset of the second electrodes is applied with a second voltage to generate electrostatic force between the subset of the second electrodes and a user's finger in a second haptic mode. The elastic dielectric member vibrates in response to the first voltage applied to the first electrodes in the first haptic mode.

In one or more embodiments, the first voltage applied to first electrodes during the first haptic mode is a sine wave or a square wave at a first frequency, and the second voltage applied to the subset of the second electrodes in the second haptic mode is a sine wave or a square wave at a second frequency.

In one or more embodiments, the first electrodes are applied with a third voltage during the second haptic mode. The third voltage applied to first electrodes during the second haptic mode may be a sine wave or a square wave at a predetermined frequency, and the second voltage applied to the subset of the second electrodes in the second haptic mode may be a sine wave or a square wave at the predetermined frequency. The third voltage applied to the first electrodes during the second haptic mode and the second voltage applied to the subset of the second electrodes in the second haptic mode may have synchronized phases.

In one or more embodiments, the first electrodes are applied with a touch driving pulse during a first sensing mode and a second sensing mode. A first touch sense signal responsive to the touch driving pulse on the second electrodes may be sensed in the first sensing mode, and a second touch sense signal responsive to the touch driving pulse on another subset of the second electrodes may be sensed in the second sensing mode.

In one or more embodiments, the second electrodes include touch sensing electrodes and adjacent electrodes adjacent to the touch sensing electrodes. Said another subset of the second electrodes may include the touch sensing electrodes but may exclude the adjacent electrodes.

In the first sensing mode, the first touch sense signal from at least one of the touch sensing electrodes and one or more of the adjacent electrodes adjacent to said one of the touch sensing electrodes may be sensed to determine a force of the touch on the touch panel. In the second sensing mode, the second touch sense signal from said one of the touch sensing electrodes but excluding the adjacent electrodes adjacent to said one of the touch sensing electrodes may be sensed to determine a location of the touch on the touch panel.

In one or more embodiments, in the second sensing mode, the second touch sense signal from said one of the touch sensing electrodes but excluding the adjacent electrodes adjacent to said one of the touch sensing electrodes is further sensed to determine whether the touch corresponds to a user's single click or double click. Responsive to determining the touch corresponds to the user's single click or double click, the first voltage applied to the first electrodes during the first haptic mode may be generated regardless of a force of the touch. Responsive to determining the touch does not correspond to the user's single click or double click, the first voltage applied to the first electrodes during the first haptic mode or the second voltage applied to the subset of the second electrodes during the second haptic mode may be generated based on the determined force of the touch.

In one or more embodiments, responsive to determining the touch corresponds to a static touch, the first voltage applied to the first electrodes during the first haptic mode is generated based on the determined force of the touch.

In one or more embodiments, responsive to determining the touch corresponds to a dynamic touch, the second voltage applied to the subset of the second electrodes during the second haptic mode is generated based on the determined force of the touch and a touch motion speed.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
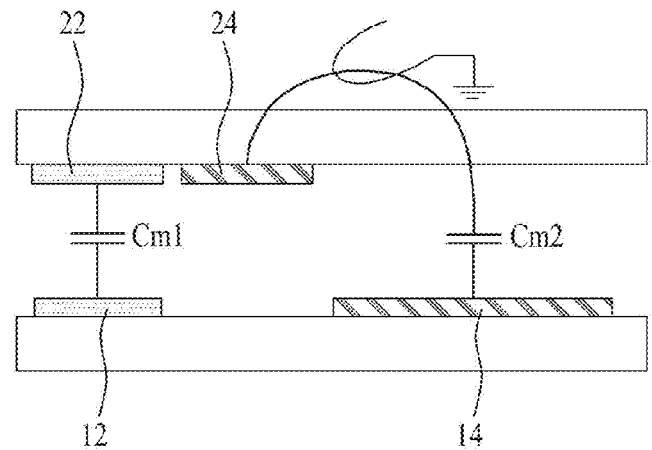
FIG. 1 is a cross sectional view illustrating a simplified arrangement of electrodes in a touch panel disclosed in the '933 Patent Document.

Reference will now be made in detail to the exemplary embodiments of the present invention, examples of which are illustrated in the accompanying drawings. Wherever possible, the same reference numbers will be used throughout the drawings to refer to the same or like parts.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims.

A shape, a size, a ratio, an angle, and a number disclosed in the drawings for describing embodiments of the present invention are merely an example, and thus, the present invention is not limited to the illustrated details. Like reference numerals refer to like elements throughout. In the following description, when the detailed description of the relevant known function or configuration is determined to unnecessarily obscure the important point of the present invention, the detailed description will be omitted. In a case where 'comprise', 'have', and 'include' described in the present specification are used, another part may be added unless 'only~' is used. The terms of a singular form may include plural forms unless referred to the contrary. In construing an element, the element is construed as including an error region although there is no explicit description.

In description of embodiments of the present invention, when a structure (for example, an electrode, a line, a wiring, a layer, or a contact) is described as being formed at an upper portion/lower portion of another structure or on/under the other structure, this description should be construed as including a case where the structures contact each other and moreover, a case where a third structure is disposed therebetween. In describing a time relationship, for example, when the temporal order is described as 'after~', 'subsequent~', 'next~', and 'before~', a case which is not continuous may be included unless 'just' or 'direct' is used. It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Features of various embodiments of the present invention may be partially or overall coupled to or combined with each other, and may be variously inter-operated with each other and driven technically as those skilled in the art can sufficiently understand. The embodiments of the present invention may be carried out independently from each other, or may be carried out together in co-dependent relationship.

Hereinafter, a touch panel according to the present invention and an apparatus for driving thereof will be described with reference to the accompanying drawings.

Figure 2:
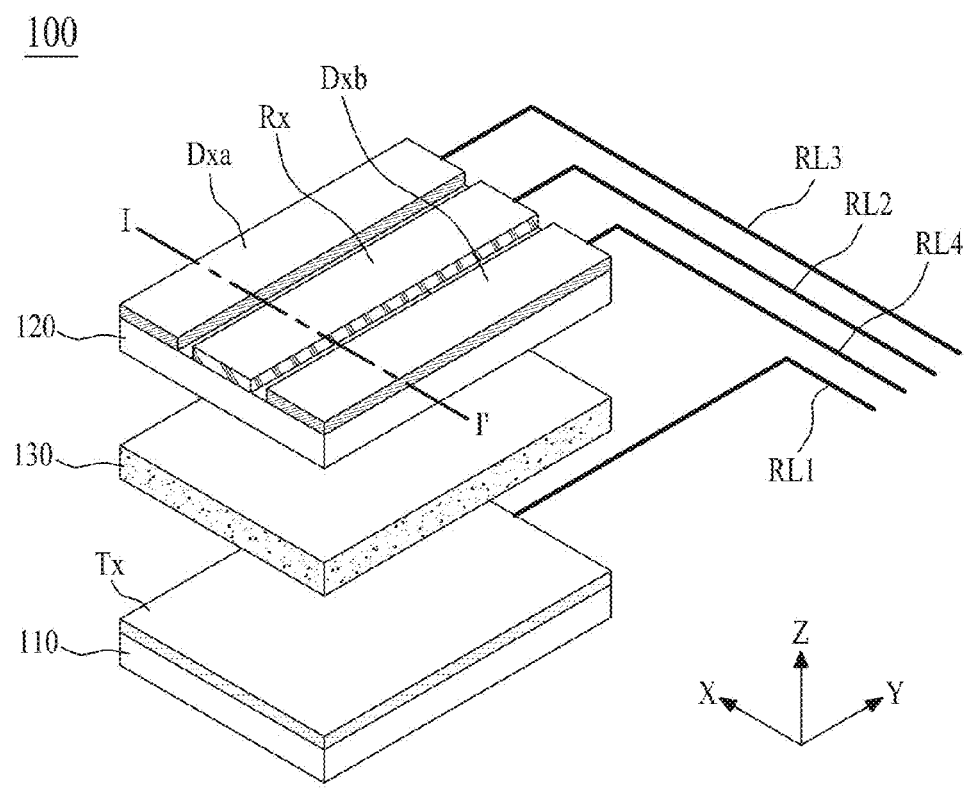
FIG. 2 illustrates a simplified structure of a touch panel according to the first embodiment of the present invention.
Figure 3:
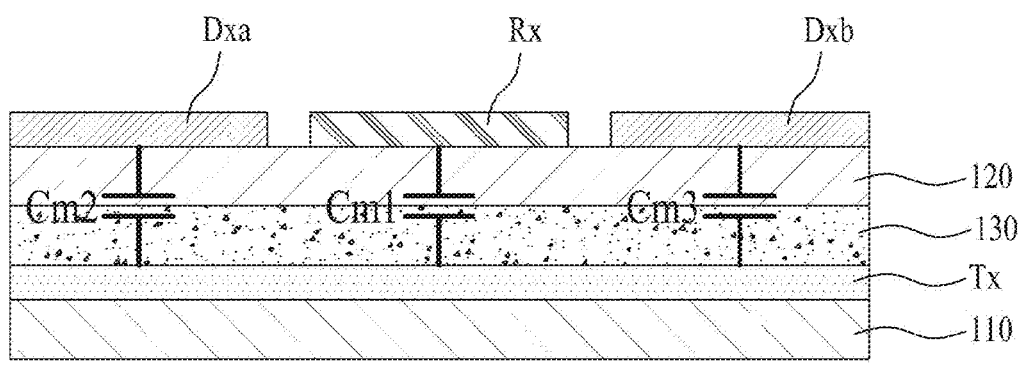
FIG. 3 is a cross sectional view of the touch panel along I-I' shown in FIG. 2.

FIG. 2 illustrates a simplified structure of a touch panel according to the first embodiment of the present invention. FIG. 3 is a cross sectional view of the touch panel along I-I' shown in FIG. 2.

Referring to FIGS. 2 and 3, a touch panel 100 according to the first embodiment of the present invention is disposed (or attached to) on a display panel of an image displaying device (not shown). The touch panel 100 according to the first embodiment of the present invention generates touch point sensing data and/or touch force sensing data in accordance with a user's touch, and provides the generated data to an external host system (not shown). Also, the touch panel 100 according to the first embodiment of the present invention provides a vibration haptic effect using vibration or an electrostatic haptic effect using electrostatic force in accordance with a haptic mode to a user. For example, if the display panel is a liquid crystal display panel (or organic light emitting display panel) including an upper polarizing film, the touch panel 100 may be disposed on the upper polarizing film, or may be disposed between an upper substrate and the upper polarizing film. The touch panel 100 may include a first substrate 110 with a touch driving electrode (Tx), a second substrate 120 with a touch sensing electrode (Rx) and first and second dummy electrodes (Dxa, Dxb), and an elastic dielectric member 130 disposed between the first and second substrates 110 and 120.

The touch panel 100 according to the first embodiment of the present invention may sense both touch point and touch force by the use of elastic dielectric member 130, and also may realize a haptic function by the use of elastic dielectric member 130 functioning as a haptic output apparatus without additionally providing the haptic output apparatus.

The first substrate 110 may be formed of a transparent plastic material. The first substrate 110 may be attached to an upper surface of the display panel by the use of transparent adhesive (not shown).

The touch driving electrode (Tx) is provided in a first direction (X) on the first substrate 110, wherein the touch driving electrode (Tx) is formed in a bar shape extending in the first direction (X) of the touch panel 100. The touch driving electrode (Tx) is connected with a touch driving circuit (not shown) through a driving routing line (RL1), and is supplied with a touch driving pulse or a voltage (e.g., alternating current (AC) voltage) from the touch driving circuit. The touch driving electrode (Tx) is used as a sensing driving electrode supplied with the touch driving pulse in accordance with a touch point sensing mode or touch force sensing mode, and is also used as a lower haptic electrode supplied with the voltage (e.g., the AC voltage) in accordance with the haptic mode.

In the same manner as the first substrate 110, the second substrate 120 may be formed of the transparent plastic material. The second substrate 120 and the first substrate 110 face each other, and the elastic dielectric member 130 is interposed between the first substrate 110 and the second substrate 120. In addition, a cover window (not shown) may be attached to an upper surface of the second substrate 120 by the use of transparent adhesive.

The touch sensing electrode (Rx) is provided in a second direction (Y) on the second substrate 120 being overlapped with the touch driving electrode (Tx), and the touch sensing electrode (Rx) is formed in a bar shape extending in the second direction (Y) of the touch panel 100. In this case, with respect to a longitudinal direction (Y), a width of the touch sensing electrode (Rx) is smaller than a width of the touch driving electrode (Tx). The touch sensing electrode (Rx) is connected with the touch driving circuit through a sensing routing line (RL2), whereby the touch sensing electrode (Rx) is used as a touch point/force sensing electrode for sensing the touch point or touch force. Also, the touch sensing electrode (Rx) is used as an upper haptic electrode supplied with a reference voltage or AC voltage from the touch driving circuit in accordance with the haptic mode. In this case, the haptic mode may be defined by an operation of the touch panel to provide the sense of touch or texture to a user by setting a haptic area in a touch area corresponding to a touch point and/or touch force area, and forming the vibration haptic effect using vibration or electrostatic haptic effect using electrostatic force in the haptic area. The reference voltage may be a ground voltage. Hereinafter, the reference voltage will be referred to as the ground voltage, and the AC voltage may be referred to as square-wave pulse or AC signal with a predetermined amplitude.

The first dummy electrode (Dxa) is formed in a bar shape with a predetermined area extending in the second direction (Y), and is provided in parallel to one side of the touch sensing electrode (Rx) being overlapped with the touch driving electrode (Tx) on the second substrate 120. In this case, with respect to the longitudinal direction (Y), the first dummy electrode (Dxa) may be provided at a predetermined interval from one side of the touch sensing electrode (Rx), and a width of the first dummy electrode (Dxa) may be smaller than a width of the touch driving electrode (Tx), or may be the same as a width of the touch sensing electrode (Rx). As the first dummy electrode (Dxa) is connected with the touch driving circuit through a first dummy routing line (RL3), the first dummy electrode (Dxa) may be floating by the touch driving circuit or may be electrically connected with the touch sensing electrode (Rx) or sensing routing line (RL2). In more detail, the first dummy electrode (Dxa) may be electrically floating in case of the touch point sensing mode, or the first dummy electrode (Dxa) may be electrically connected with the touch sensing electrode (Rx) in case of the touch force sensing mode or haptic mode. Accordingly, the first dummy electrode (Dxa) is used as a touch force sensing electrode for sensing the touch force, and the first dummy electrode (Dxa) is also used as a floating electrode enabling to sense the touch point. Also, the first dummy electrode (Dxa) is used as the upper haptic electrode supplied with the ground voltage from the touch driving circuit or through the touch sensing electrode (Rx) in accordance with the haptic mode.

The second dummy electrode (Dxb) is formed in a bar shape with a predetermined area extending in the second direction (Y), and the second dummy electrode (Dxb) is provided in parallel to the other side of the touch sensing electrode (Rx) being overlapped with the touch driving electrode (Tx) on the second substrate 120. In this case, with respect to the longitudinal direction (Y), the second dummy electrode (Dxb) may be provided at a predetermined interval from the other side of the touch sensing electrode (Rx), and a width of the second dummy electrode (Dxb) may be smaller than a width of the touch driving electrode (Tx), or may be the same as a width of the touch sensing electrode (Rx) or first dummy electrode (Dxa). As the second dummy electrode (Dxb) is connected with the touch driving circuit through a second dummy routing line (RL4), the second dummy electrode (Dxb) may be maintained in the floating state by the touch driving circuit, or may be electrically connected with the touch sensing electrode (Rx). In more detail, the second dummy electrode (Dxb) may be electrically floating in case of the touch point sensing mode, or may be electrically connected with the touch sensing electrode (Rx) or sensing routing line (RL2) in case of the touch force sensing mode or haptic mode. Accordingly, the second dummy electrode (Dxb) is used as a touch force sensing electrode for sensing the touch force, and the second dummy electrode (Dxb) is used as a floating electrode to enable sensing the touch point. Also, the second dummy electrode (Dxb) is used as the upper haptic electrode supplied with the ground voltage or AC voltage from the touch driving circuit or through the touch sensing electrode (Rx) in accordance with the haptic mode.

In FIGS. 2 and 3, each of the first and second dummy electrodes (Dxa, Dxb) is formed in one bar shape, but is not limited to this shape. In order to improve a transmittance of light emitted from the display panel, each of the first and second dummy electrodes (Dxa, Dxb) may be formed in a line structure, a mesh structure or a ladder structure including a plurality of dummy electrodes electrically connected with one another, or may include a plurality of slits at fixed intervals or a plurality of openings arranged in a grid pattern.

The elastic dielectric member 130 is interposed between the first substrate 110 and the second substrate 120. In this case, the elastic dielectric member 130 may be attached to an upper surface of the first substrate 110 or a lower surface of the second substrate 120 by the use of transparent adhesive. The elastic dielectric member 130 may be formed of a material with elasticity and high dielectric constant. For example, the elastic dielectric member 130 may be formed of PDMS (polydimethylsiloxane), acrylic or poly-urethane material, but not be limited to these materials. The elastic dielectric member 130 may be formed of any material with elasticity and high dielectric constant.

Figure 4:
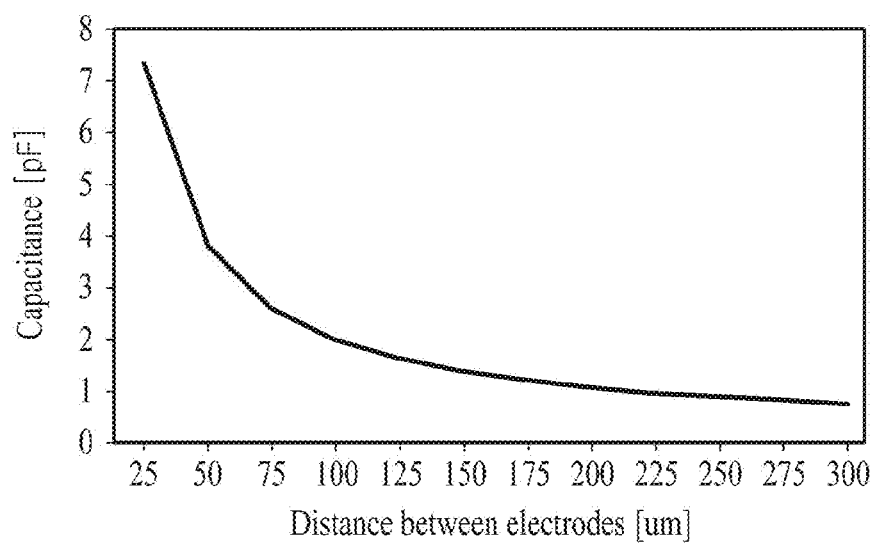
FIG. 4 is a graph for explaining a change of capacitance in accordance with a distance of electrodes overlapping each other with an elastic dielectric member interposed therebetween, shown in FIG. 2.

The elastic dielectric member 130 forms a capacitance (Cm1, Cm2, Cm3) among the touch sensing electrode (Rx), each of the first and second dummy electrodes (Dxa, Dxb), and the touch driving electrode (Tx). Specifically, the elastic dielectric member 130 is changed in its elasticity by a user's touch force, and thus changed in its thickness, to thereby change the capacitance (Cm1, Cm2, Cm3). In this case, the capacitance (Cm1, Cm2, Cm3) may be changed in accordance with each distance among the touch sensing electrode (Rx), each of the first and second dummy electrodes (Dxa, Dxb), and the touch driving electrode (Tx), as shown in FIG. 4. In this case, as the capacitance (Cm1, Cm2, Cm3) is inversely proportional to each distance among the electrodes, the touch force may be sensed by a force level algorithm for modeling an increased variation of the capacitance (Cm1, Cm2, Cm3) in accordance with the touch force.

Also, the elastic dielectric member 130 functions as the haptic output apparatus for the haptic mode. That is, the haptic mode according to the present invention may be classified into a vibration haptic mode using vibration of the elastic dielectric member 130, and an electrostatic haptic mode using electrostatic force of the elastic dielectric member 130. For example, in case of the vibration haptic mode, the ground voltage is applied to the touch sensing electrode (Rx) and each of the first and second dummy electrodes (Dxa, Dxb), and simultaneously, an AC voltage is applied to the touch driving electrode (Tx), whereby the elastic dielectric member 130 is vibrated in accordance with a frequency of the AC voltage through repetitive expansion and shrinkage by means of piezoelectric effect, and a vibration level is changed in accordance with the amplitude of the AC voltage. In case of the electrostatic haptic mode, the elastic dielectric member 130 functions as an insulating layer. That is, as a first AC voltage which may be different from the AC voltage applied to the touch driving electrode (TX) during the vibration haptic mode is applied to the touch sensing electrode (Rx) and each of the first and second dummy electrodes (Dxa, Dxb), and simultaneously, a second AC voltage is applied to the touch driving electrode (Tx), the electrostatic force occurs between the electrodes and a user's finger, and an intensity of the electrostatic force varies in accordance with the amplitude and/or frequency of the AC voltage. Accordingly, in case of the haptic mode, the elastic dielectric member 130 is used as the haptic output apparatus, that is, actuator, whereby the touch panel 100 according to the first embodiment of the present invention provides the haptic effect without the additional haptic output apparatus, to thereby realize a simplified structure and a reduced cost in the touch panel 100 according to the first embodiment of the present invention.

As the elastic dielectric member 130 with elasticity and high dielectric constant is interposed between the first and second substrates 110 and 120, a first touch sensor (Cm1) for sensing the touch point or touch force is formed at an intersection of the touch driving electrode (Tx) and the touch sensing electrode (Rx). The first touch sensor (Cm1) is formed by a dielectric constant of the elastic dielectric member 130, an a capacitance based on an overlapping area between the touch driving electrode (Tx) and the touch sensing electrode (Rx) and a distance between the touch driving electrode (Tx) and the touch sensing electrode (Rx). In this case, an electric charge corresponding to a touch driving pulse supplied to the touch driving electrode (Tx) is charged in the first touch sensor (Cm1), and the electric charge of the first touch sensor (Cm1) is discharged to the touch sensing electrode (Rx). An amount of electric charge in the first touch sensor (Cm1) varies according to whether or not there is a user's touch.

Figure 5A:
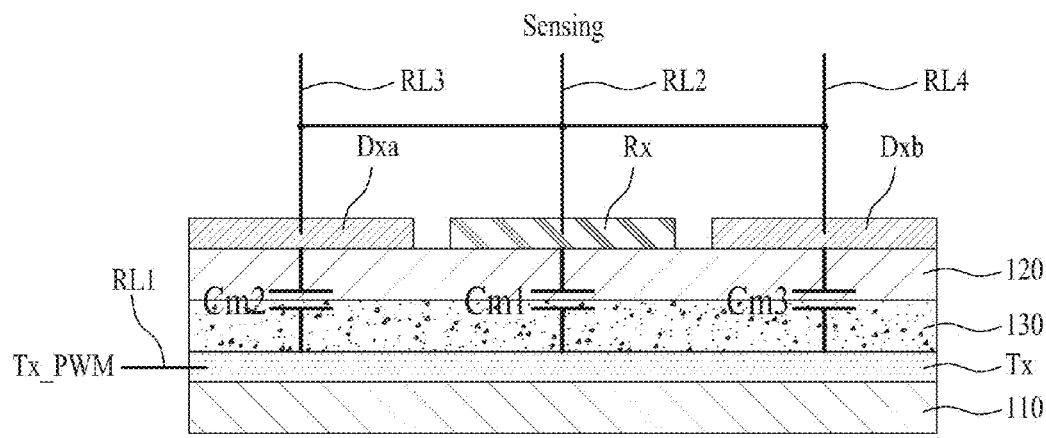
FIGS. 5A through 5D are cross sectional views of the touch panel shown in FIG. 2 illustrating a connection between a touch sensing electrode and each of first and second dummy electrodes in accordance with a touch force sensing mode, a touch point sensing mode, and a haptic mode, respectively.

As shown in FIG. 5A, when the first dummy electrode (Dxa) is electrically connected with the touch sensing electrode (Rx) or sensing routing line (RL2) in accordance with the touch force sensing mode, the first dummy electrode (Dxa) functions as the touch force sensing electrode which is identical to the touch sensing electrode (Rx), whereby a second touch sensor (Cm2) for sensing the touch force is formed at an intersection between the touch driving electrode (Tx) and the first dummy electrode (Dxa). The second touch sensor (Cm2) is formed by a dielectric constant of the elastic dielectric member 130, and a capacitance based on an overlapping area between the touch driving electrode (Tx) and the first dummy electrode (Dxa) and a distance between the touch driving electrode (Tx) and the first dummy electrode (Dxa). As shown in FIG. 4, the capacitance of the second touch sensor (Cm2) varies in accordance with the distance between the touch driving electrode (Tx) and the first dummy electrode (Dxa). In this case, an electric charge corresponding to a touch driving pulse (Tx_PWM) supplied to the touch driving electrode (Tx) is charged in the second touch sensor (Cm2), and the electric charge of the second touch sensor (Cm2) is discharged to the first dummy electrode (Dxa). An amount of electric charge in the second touch sensor (Cm2) varies in accordance with the distance between the touch driving electrode (Tx) and the first dummy electrode (Dxa) by a user's touch force.

Figure 5B:
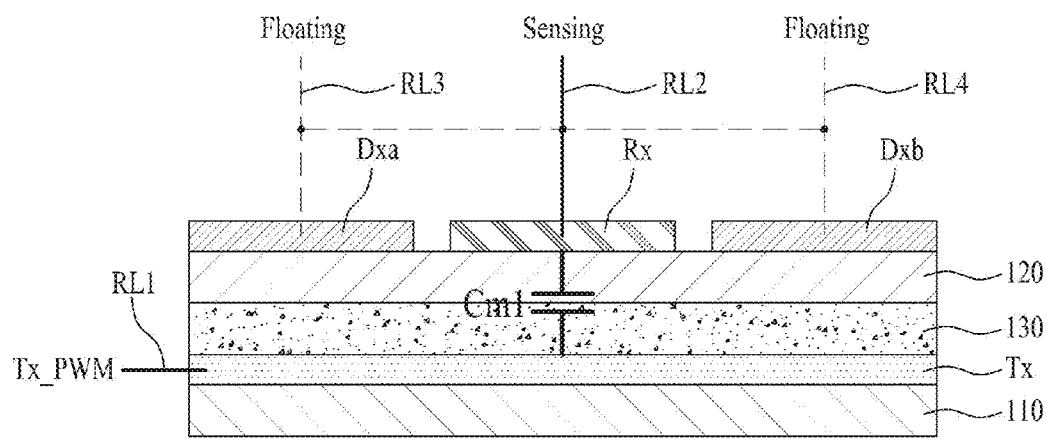

Meanwhile, as shown in FIG. 5B, when the first dummy electrode (Dxa) is electrically floating without being connected with the touch sensing electrode (Rx) in accordance with the touch point sensing mode, the capacitance (Cm2) is not formed between the touch driving electrode (Tx) and the first dummy electrode (Dxa). Accordingly, the capacitance of the first touch sensor (Cm1) formed between the touch driving electrode (Tx) and the touch sensing electrode (Rx) is changed in accordance with the touch by the use of conductive object, whereby it is possible to sense the touch point, and furthermore to improve sensing efficiency of the touch point.

As shown in FIG. 5A, when the second dummy electrode (Dxb) is electrically connected with the touch sensing electrode (Rx) or sensing routing line (RL2) in accordance with the touch force sensing mode, the second dummy electrode (Dxb) functions as the touch force sensing electrode which is identical to the touch sensing electrode (Rx), whereby a third touch sensor (Cm3) for sensing the touch force is formed at an intersection between the touch driving electrode (Tx) and the second dummy electrode (Dxb). The third touch sensor (Cm3) is formed by a dielectric constant of the elastic dielectric member 130, and a capacitance based on an overlapping area between the touch driving electrode (Tx) and the second dummy electrode (Dxb) and a distance between the touch driving electrode (Tx) and the second dummy electrode (Dxb). As shown in FIG. 4, the capacitance of the third touch sensor (Cm3) varies in accordance with the distance between the touch driving electrode (Tx) and the second dummy electrode (Dxb). In this case, an electric charge corresponding to a touch driving pulse (Tx_PWM) supplied to the touch driving electrode (Tx) is charged in the third touch sensor (Cm3), and the electric charge of the third touch sensor (Cm3) is discharged to the second dummy electrode (Dxb). An amount of electric charge in the third touch sensor (Cm3) varies in accordance with the distance between the touch driving electrode (Tx) and the second dummy electrode (Dxb) by a user's touch force.

Meanwhile, as shown in FIG. 5B, when the second dummy electrode (Dxb) is electrically floating without being connected with the touch sensing electrode (Rx) in accordance with the touch point sensing mode, the capacitance (Cm3) is not formed between the touch driving electrode (Tx) and the second dummy electrode (Dxb). Accordingly, the capacitance of the first touch sensor (Cm1) formed between the touch driving electrode (Tx) and the touch sensing electrode (Rx) is changed in accordance with the touch by the use of conductive object, whereby it is possible to sense the touch point, and furthermore to improve sensing efficiency of the touch point.

Figure 5C:
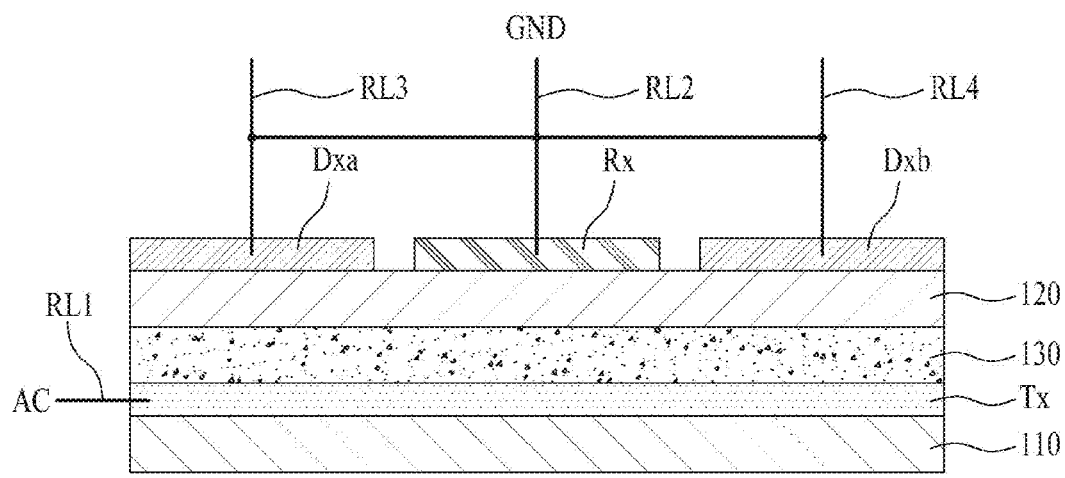

Meanwhile, as shown in FIG. 5C, when the ground voltage (GND) is applied to the touch sensing electrode (Rx) and each of the first and second dummy electrodes (Dxa, Dxb), and the AC voltage (AC) is applied to the touch driving electrode (Tx) in accordance with the vibration haptic mode, the elastic dielectric member 130 is vibrated through the repetitive expansion and shrinkage by the means of piezoelectric effect. Accordingly, the user senses tactile information in accordance with the vibration of elastic dielectric member 130. For the vibration haptic mode, each of the first and second dummy electrodes (Dxa, Dxb) may be electrically floating. In order to realize more-improved vibration haptic effect, it is preferable that each of the first and second dummy electrodes (Dxa, Dxb) be electrically connected with the touch sensing electrode (Rx), and be applied with the ground voltage (GND) in accordance with the vibration haptic mode.

Figure 5D:
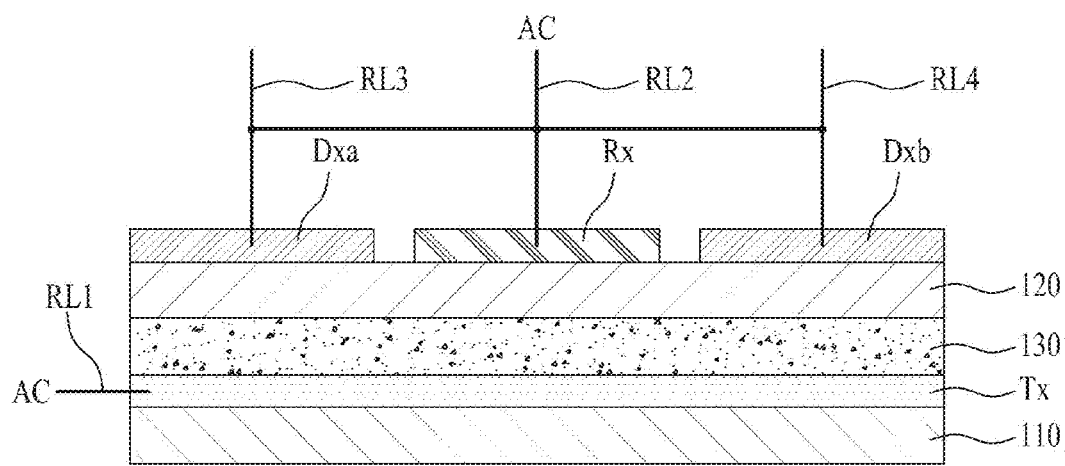

Also, as shown in FIG. 5D, when a first AC voltage (AC) is applied to the touch sensing electrode (Rx) and each of the first and second dummy electrodes (Dxa, Dxb, the electrostatic force occurs between the electrodes and a user's finger in accordance with the flow of first AC voltage (AC). Accordingly, the user senses tactile information in accordance with the electrostatic force. For the electrostatic haptic mode, each of the first and second dummy electrodes (Dxa, Dxb) may be electrically floating. In order to realize more-improved electrostatic haptic effect, it is preferable that each of the first and second dummy electrodes (Dxa, Dxb) be electrically connected with the touch sensing electrode (Rx), and be applied with the first AC voltage (AC) in accordance with the electrostatic haptic mode. In one embodiment, a second AC voltage (AC) is applied to the touch driving electrode (Tx) in accordance with the electrostatic haptic mode. The first AC voltage and the second AC voltage may have synchronized phases.

Instead of the aforementioned bar shape, each of the touch driving electrode (Tx) and the touch sensing electrode (Rx) may be formed in a circular or diamond shape, and each of the first and second dummy electrodes (Dxa, Dxb) may be formed to surround the touch sensing electrode (Rx) on halves. Preferably, each of the electrodes (Tx, Rx, Dxa, Dxb) is formed in the bar shape in order to sufficiently secure the capacitance for sensing the touch point and the capacitance for sensing the touch force, as mentioned above.

The touch panel 100 according to the first embodiment of the present invention facilitates to improve the sensing efficiency of the touch point by electrically floating the first and second dummy electrodes (Dxa, Dxb) in accordance with the touch point sensing mode, and also to improve the sensing efficiency of the touch force by increasing the area of the force sensing electrode for sensing the touch force through the electrical connection between the touch sensing electrode (Rx) and the first and second dummy electrodes (Dxa, Dxb). Hence, a larger capacitance is charged between the touch driving electrode (Tx) and a combination of the touch sensing electrode (Rx) and the first dummy electrode (Dxa) and/or the second dummy electrode (Dxb) in the touch force sensing mode, compared to a capacitance charged between the touch driving electrode (Tx) and the touch sensing electrode (Rx) in the touch point sensing mode. Large capacitance charged between the touch driving electrode (Tx) and the combination of the touch sensing electrode (Rx) and the first dummy electrode (Dxa) and/or the second dummy electrode (Dxb) in the touch force sensing mode enables accurate sensing of touch force. In addition, less capacitance charged between the touch driving electrode (Tx) and the touch sensing electrode (Rx) in the touch point sensing mode enables enough fringe field to be formed between the touch driving electrode (Tx) and the touch sensing electrode (Rx) to allow accurate sensing of touch point (or whether a specific electrode is touched or not). Eventually, the touch panel 100 according to the first embodiment of the present invention enables to improve both the touch force sensing efficiency and the touch point sensing efficiency. In the touch panel 100 according to the first embodiment of the present invention in accordance with the haptic mode, as the ground voltage or an AC voltage is applied to the touch sensing electrode (Rx) and each of the first and second dummy electrodes (Dxa, Dxb), and an AC voltage is applied to the touch driving electrode (Tx), the elastic dielectric member 130 is used as the actuator corresponding to the haptic output apparatus, whereby it is possible to provide the haptic effect to a user without the additional haptic output apparatus. Specifically, as each of the first and second dummy electrodes (Dxa, Dxb) is electrically connected with the touch sensing electrode (Rx) for the haptic mode of the touch panel 100 according to the first embodiment of the present invention, the area of haptic electrode is increased so that it is possible to effectively provide the tactile information or texture information based on the haptic effect to a user.

Figure 6:
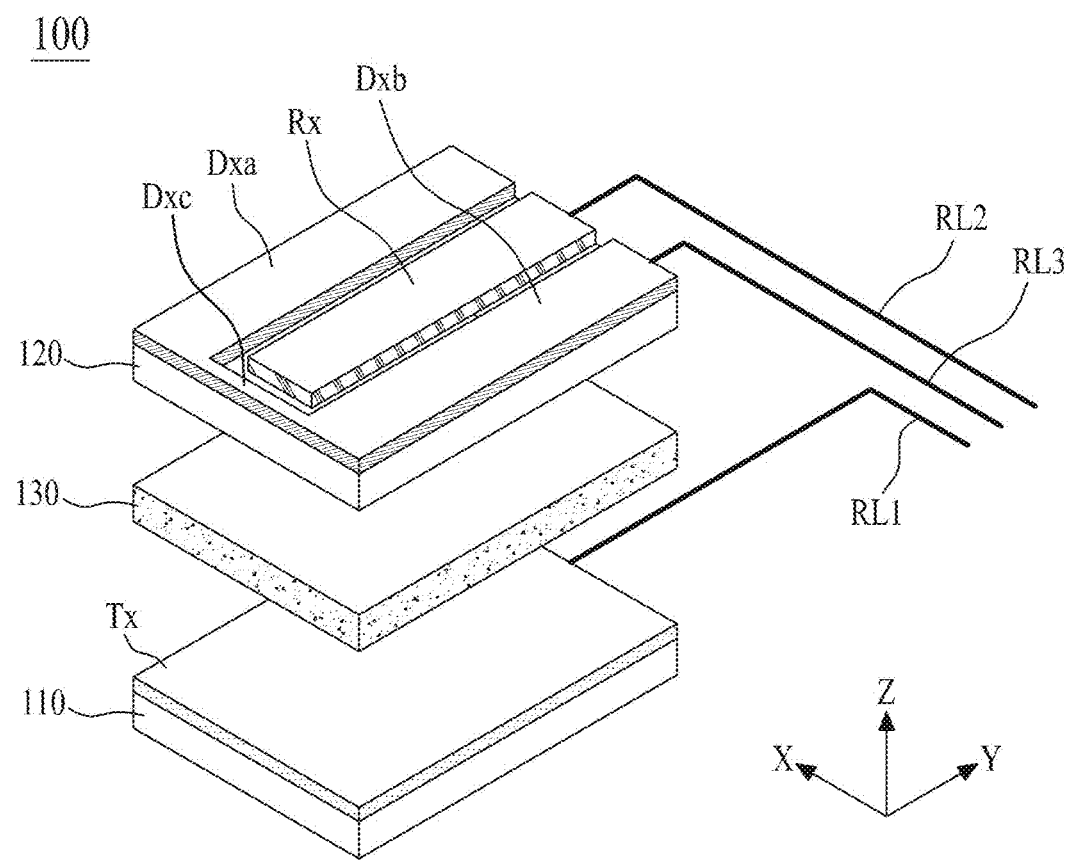
FIG. 6 illustrates a modified example of the touch panel according to the first embodiment of the present invention.

FIG. 6 illustrates a modified example of the touch panel according to the first embodiment of the present invention, wherein one side of the first dummy electrode is electrically connected with one side of the second dummy electrode. Hereinafter, only the first and second dummy electrodes will be described in detail as follows.

One side of the first dummy electrode (Dxa) is electrically connected with one side of the second dummy electrode (Dxb) through a dummy bridge electrode (Dxc).

The dummy bridge electrode (Dxc) is provided at a predetermined interval from one side of the touch sensing electrode (Rx) while being in parallel to one side of the touch sensing electrode (Rx), whereby the dummy bridge electrode (Dxc) is electrically connected with both one side of the first dummy electrode (Dxa) and one side of the second dummy electrode (Dxb). Accordingly, the dummy bridge electrode (Dxc) and the first and second dummy electrodes (Dxa, Dxb) are provided in shape of "⊂" or "⊃".

Additionally, one side of the first dummy electrode (Dxa) is electrically connected with one side of the second dummy electrode (Dxb) through the dummy bridge electrode (Dxc), whereby it is possible to omit any one of the first and second dummy routing lines (RL3, RL4). Accordingly, a width of edge in the touch panel 100 provided with the routing line is reduced so that a bezel width of the touch panel 100 is reduced.

Figure 7:
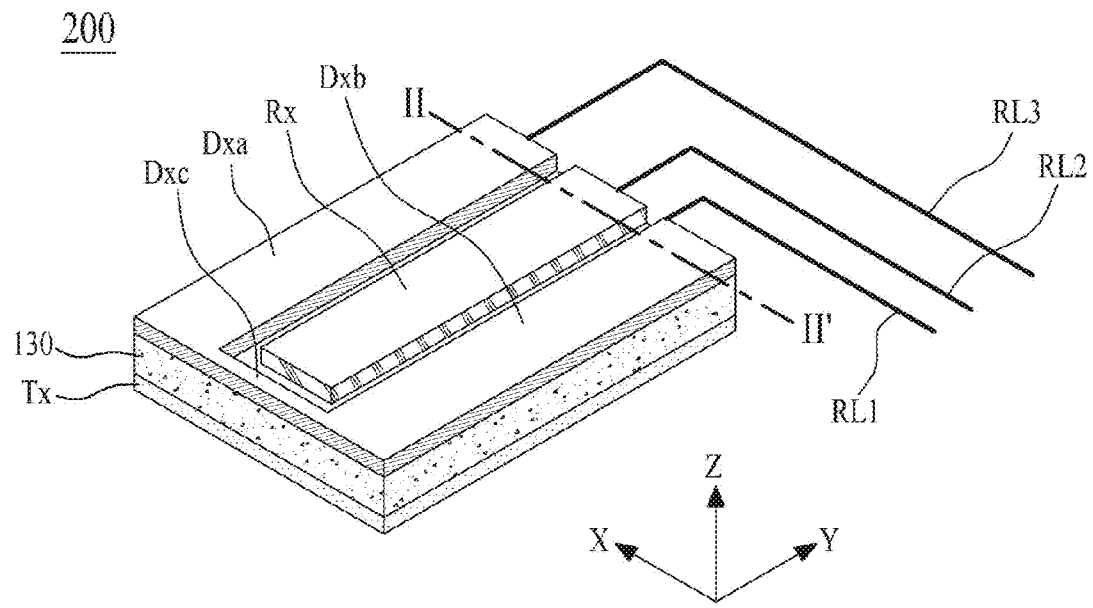
FIG. 7 illustrates a simplified structure of a touch panel according to the second embodiment of the present invention.
Figure 8:
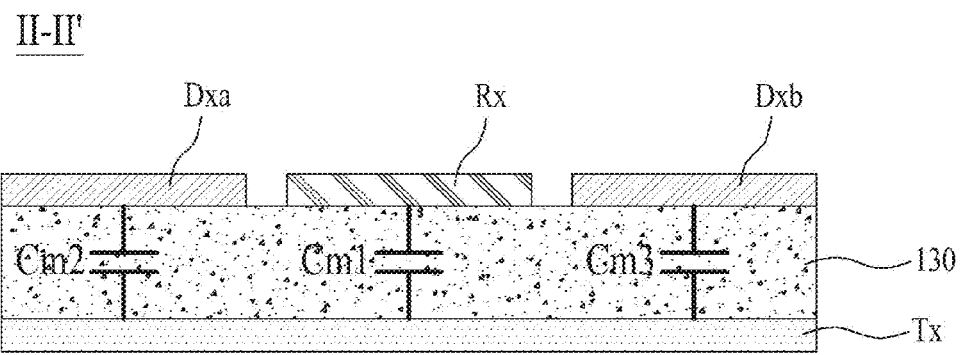
FIG. 8 is a cross sectional view of the touch panel along II-II' shown in FIG. 7.

FIG. 7 illustrates a simplified structure of a touch panel 200 according to the second embodiment of the present invention. FIG. 8 is a cross sectional view of the touch panel 200 along II-IP shown in FIG. 7. Herein, a touch panel 200 shown in FIG. 7 is obtained by providing the touch driving electrode (Tx) on a lower surface of the elastic dielectric member 130, and providing the touch sensing electrode (Rx) and the first and second dummy electrodes (Dxa, Dxb) on an upper surface of the elastic dielectric member 130 in the aforementioned touch panel 100 according to the first embodiment of the present invention. That is, in case of the touch panel 200 according to the second embodiment of the present invention, the touch driving electrode (Tx), the aforementioned first and second substrates 110 and 120 are removed from the touch panel 200. Except that the first and second substrates 110 and 120 are removed from the touch panel 200, the touch panel 200 according to the second embodiment of the present invention is identical in electrode structure to the touch panel 100 of FIG. 6, whereby it is possible to sense both the touch point and the touch force, and to realize a thin profile of the touch panel by the simplified structure.

In FIGS. 7 and 8, one side of the first dummy electrode (Dxa) is electrically connected with one side of the second dummy electrode (Dxb) through the dummy bridge electrode (Dxc), but is not limited to this structure. That is, it is possible to omit the dummy bridge electrode (Dxc). In this case, the electrode structure of the touch panel 200 according to the second embodiment of the present invention may be identical to the electrode structure of the touch panel 100 shown in FIG. 2, whereby the touch driving electrode (Tx) may be formed on the lower surface of the elastic dielectric member 130, and the touch sensing electrode (Rx) and the first and second dummy electrodes (Dxa, Dxb) may be formed on the upper surface of the elastic dielectric member 130.

The lower surface of the touch panel 200 according to the second embodiment of the present invention, that is, the touch driving electrode (Tx) may be attached to the upper surface of the display panel by the use of transparent adhesive. The upper surface of the touch panel 200 according to the second embodiment of the present invention, that is, the touch sensing electrode (Rx) and the first and second dummy electrodes (Dxa, Dxb) may be covered with the cover window by the use of transparent adhesive.

In the aforementioned first and second embodiments of the present invention, each of the touch panels 100 and 200 includes the first and second dummy electrodes (Dxa, Dxb), but is not limited to this structure. According to a modified example of the present invention, each of the touch panels 100 and 200 may include the first and second dummy electrodes (Dxa, Dxb), wherein any one of the first and second dummy electrodes (Dxa, Dxb) may be electrically floating without regard to the sensing mode, and another thereof may be electrically floating or connected with the touch sensing electrode in accordance with the sensing mode.

According to another modified example of the present invention, each of the touch panels 100 and 200 may include any one of the first and second dummy electrodes (Dxa, Dxb). In this case, it may cause the decrease in the area of electrode used as the touch sensing electrode for sensing the touch force in accordance with the touch force sensing mode, however, an electric field forming area formed between the touch driving electrode (Tx) and the touch sensing electrode (Rx) is increased in size by an area of one dummy electrode in accordance with the touch point sensing mode, to thereby improve the efficiency for sensing the touch point.

Figure 9:
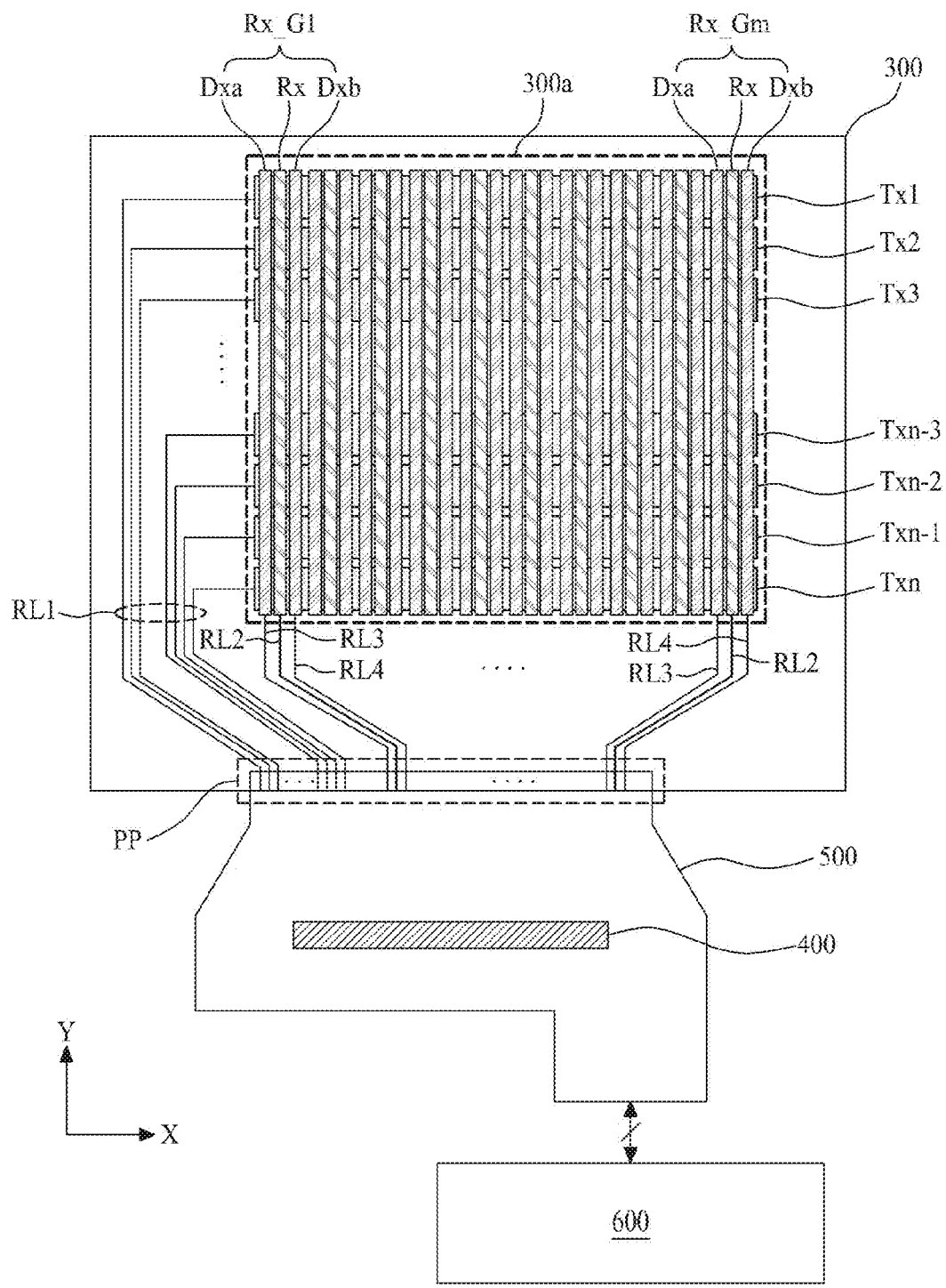
FIG. 9 illustrates an apparatus for driving of touch panel according to one embodiment of the present invention.
Figure 10:
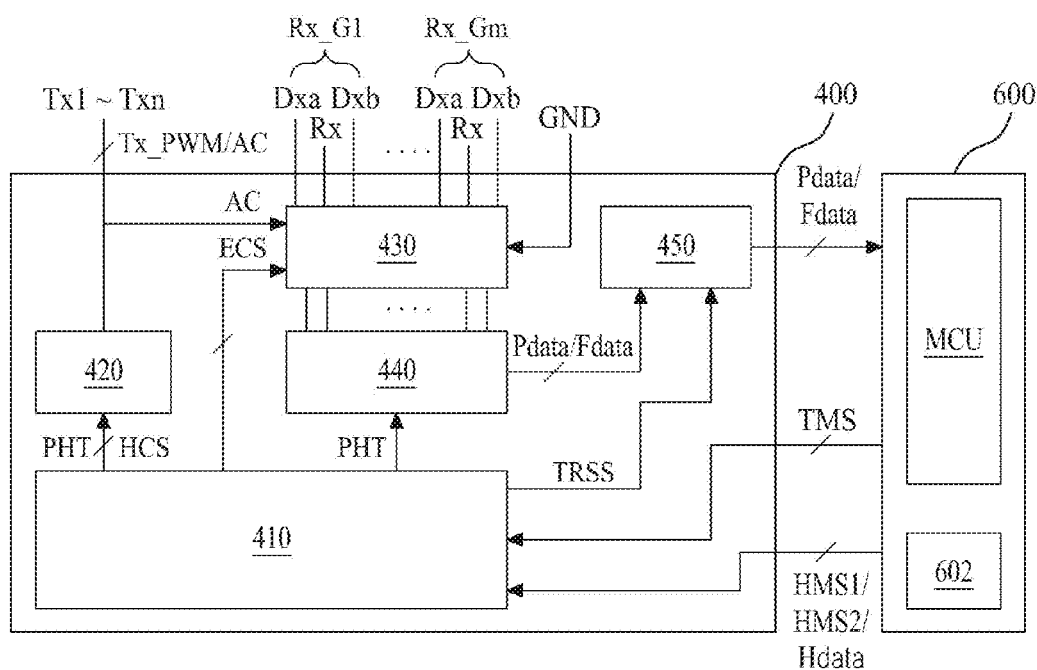
FIG. 10 is a block diagram for explaining a touch driving circuit and a host system of FIG. 9.

FIG. 9 illustrates an apparatus for driving of touch panel according to one embodiment of the present invention. FIG. 10 is a block diagram for explaining a touch driving circuit of FIG. 9.

Referring to FIGS. 9 and 10, the apparatus for driving of touch panel according to one embodiment of the present invention may include a touch panel 300 and a touch driving circuit 400.

The touch panel 300 may include first to n-th touch driving electrodes (Tx1~Txn), an elastic dielectric member (130, See FIG. 2) disposed on the first to n-th touch driving electrodes (Tx1~Txn), and first to m-th touch sensing electrode groups (Rx_G1~Rx_Gm) disposed on the elastic dielectric member, and respectively overlapped and intersected with the respective first to n-th touch driving electrodes (Tx1~Txn).

Each of the first to n-th touch driving electrodes (Tx1~Txn) is formed in a bar shape extending in the first direction (X) of the touch panel 300, wherein the first to n-th touch driving electrodes (Tx1~Txn) are provided at fixed intervals along the second direction (Y) on a touch sensing area 300a of the touch panel 300. The first to n-th touch driving electrodes (Tx1~Txn) are connected with a touch driving circuit 400 through a pad portion (PP) and corresponding driving routing line (RL1) formed in a first edge of the touch panel 300. The first to n-th touch driving electrode (Tx1~Txn) may be formed on the first substrate (110, See FIG. 2), or may be formed on the lower surface of the elastic dielectric member (130, See FIG. 7).

The elastic dielectric member may be formed of a material with elasticity and high dielectric constant, and may be disposed on the first to n-th touch driving electrodes (Tx1~Txn). This elastic dielectric member is the same as the elastic dielectric member 130 shown in FIGS. 2 and 3, whereby a detailed description for the elastic dielectric member will be omitted.

Each of the first to m-th touch sensing electrode groups (Rx_G1~Rx_Gm) is formed in a bar shape extending in the second direction (Y) of the touch panel 300. The first to m-th touch sensing electrode groups (Rx_G1~Rx_Gm) are formed at fixed intervals along the first direction (X) on the touch sensing area 300a of the touch panel 300, wherein the first to m-th touch sensing electrode groups (Rx_G1~Rx_Gm) respectively intersect with the first to n-th touch driving electrodes (Tx1~Txn). The first to m-th touch sensing electrode groups (Rx_G1~Rx_Gm) may be formed on the second substrate (120, See FIG. 2), or may be formed on the upper surface of the elastic dielectric member (130, See FIG. 7).

Each of the first to m-th touch sensing electrode groups (Rx_G1~Rx_Gm) may include the touch sensing electrode (Rx), the first dummy electrode (Dxa) and the second dummy electrode (Dxb).

The touch sensing electrode (Rx) is used as a touch point/force sensing electrode for sensing a touch point or touch force. The touch sensing electrode (Rx) is connected with the touch driving circuit 400 through the pad portion (PP) and sensing routing line (RL2) formed in a second edge of the touch panel 300. Also, the touch sensing electrode (Rx) is used as an upper haptic electrode for the haptic effect. The touch sensing electrode (Rx) is identical to the touch sensing electrode (Rx) shown in FIGS. 2 and 3.

The first dummy electrode (Dxa) is used only as the touch force sensing electrode for sensing the touch force, or the upper haptic electrode for the haptic effect. The first dummy electrode (Dxa) is connected with the touch driving circuit 400 through the pad portion (PP) and first dummy routing line (RL3) formed in the second edge of the touch panel 300. The first dummy electrode (Dxa) is the same as the first dummy electrode (Dxa) shown in FIGS. 2 and 3.

The second dummy electrode (Dxb) may be used only as the touch force sensing electrode for sensing the touch force, or the upper haptic electrode for the haptic effect. The second dummy electrode (Dxb) is connected with the touch driving circuit 400 through the pad portion (PP) and second dummy routing line (RL4) formed in the second edge of the touch panel 300. The second dummy electrode (Dxb) is the same as the second dummy electrode (Dxb) shown in FIGS. 2 and 3.

The touch driving circuit 400 is provided on a flexible circuit film 500 attached to the pad portion (PP) of the touch panel 300, and is connected with each of the routing lines (RL1, RL2, RL3, RL4) through the pad portion (PP). Alternatively, the touch driving circuit 400 may be provided on a printed circuit board (not shown). In this case, the touch driving circuit 400 may be connected with each of the routing lines (RL1, RL2, RL3, RL4) through a flexible circuit film (not shown) connected between the printed circuit board and the pad portion (PP) of the touch panel 300.

In response to a touch mode signal (TMS) supplied from the host system 600, the touch driving circuit 400 supplies a touch driving pulse (Tx_PWM) to each of the first to n-th touch driving electrodes (Tx1~Txn), and also senses a touch sense signal indicating a change of capacitance through each of the first to m-th touch sensing electrode groups (Rx_G1~Rx_Gm). That is, the touch driving circuit 400 generates touch point sensing data (Pdata) or touch force sensing data (Fdata) by driving the touch panel 300 in a time division method according to the touch point sensing mode or touch force sensing mode, and provides the generated touch point sensing data (Pdata) or touch force sensing data (Fdata) to the host system 600. For example, in case of the touch point sensing mode, after the touch driving circuit 400 electrically floats the first and second dummy electrodes (Dxa, Dxb) for each of the plurality of touch sensing electrode groups (Rx_G1~Rx_Gm), the touch driving circuit 400 sequentially supplies the touch driving pulse (Tx_PWM) to each of the first to n-th touch driving electrodes (Tx1~Txn), and simultaneously senses the touch sense signal indicating the change of charge amount in the first touch sensor (Cm1, See FIG. 5B) through the touch sensing electrode (Rx) for each of the first to m-th touch sensing electrode groups (Rx_G1~Rx_Gm), to thereby generate touch point sensing data (Pdata). In case of the touch force sensing mode, after the touch driving circuit 400 electrically connects the first and second dummy electrodes (Dxa, Dxb) to the touch sensing electrode (Rx) in a unit of the first to m-th touch sensing electrode groups (Rx_G1~Rx_Gm), the touch driving circuit 400 sequentially supplies the touch driving pulse (Tx_PWM) to each of the first to n-th touch driving electrodes (Tx1~Txn), and simultaneously senses the touch sense signal indicating the change of charge amount in the first to third touch sensors (Cm1, Cm2, Cm3) through the touch sensing electrode (Rx) for each of the first to m-th touch sensing electrode groups (Rx_G1~Rx_Gm), to thereby generate touch force sensing data (Fdata).

In case of the vibration haptic mode in accordance with a first haptic mode signal (HMS1) supplied from the host system 600, the touch driving circuit 400 applies an AC voltage (AC) to at least one touch driving electrode (Tx1~Txn) included in the haptic area among the first to n-th touch driving electrodes (Tx1~Txn), and applies the ground voltage (GND) to the touch sensing electrode (Rx) and the first and second dummy electrodes (Dxa, Dxb) of at least one touch sensing electrode group (Rx_G1~Rx_Gm) included in the haptic area, whereby some area of the elastic dielectric member 130 corresponding to the haptic area is vibrated to provide the tactile information according to the vibration haptic effect to a user. In case of the vibration haptic mode, the touch driving circuit 400 according to another example of the present invention may apply the ground voltage (GND) to the electrodes for each of the touch sensing electrode groups (Rx_G1~Rx_Gm), and applies the AC voltage (AC) to all the first to n-th touch driving electrodes (Tx1~Txn), whereby it is possible to provide the vibration haptic effect to the entire area of the touch panel 300.

In case of the electrostatic haptic mode in accordance with a second haptic mode signal (HMS2) supplied from the host system 600, the touch driving circuit 400 applies a second AC voltage (AC) to at least one touch driving electrode (Tx1~Txn) included in the haptic area among the first to n-th touch driving electrodes (Tx1~Txn), and applies a first AC voltage (AC) to the touch sensing electrode (Rx) and the first and second dummy electrodes (Dxa, Dxb) of at least one touch sensing electrode group (Rx_G1~Rx_Gm) included in the haptic area, whereby the electrostatic force is formed in the haptic area so as to provide the texture information according to the electrostatic haptic effect to a user.

The touch driving circuit 400 may include a timing generating part 410, a driving signal supplying part 420, an electrode connecting part 430, a sensing part 440 and a sensing data processing part 450. The touch driving circuit 400 of the above structure may be integrated as one ROIC (Readout Integrated Circuit) chip. However, the sensing data processing part 450 may be implemented as MCU (Micro Controller Unit) of host system 600 without being integrated with the ROIC chip.

The timing generating part 410 generates a sensing start signal (PHT) in response to a touch mode signal (TMS) supplied from the MCU of host system 600, and controls a driving timing for each of the driving signal supplying part 420 and the sensing part 440. In this case, the touch mode signal (TMS) may be any one selected among a touch point sensing mode signal, a touch force sequential sensing mode signal, a touch force partial sensing mode signal and a touch force group sensing mode signal. Accordingly, the timing generating part 410 may generate touch control signals including sensing start signal (PHT), Tx channel setup signal, electrode connection signal (ECS), Rx channel setup signal and touch report synchronization signal (TRSS) on the basis of touch mode signal (TMS).

Also, the timing generating part 410 generates a haptic control signal (HCS) based on haptic data (Hdata) and haptic mode signal (HMS) supplied from the MCU of host system 600, and controls the driving signal supplying part 420 by the haptic control signal (HCS). In this case, the haptic mode signal (HMS) may be the first haptic mode signal (HMS1) of first logic state for the vibration haptic effect, or the second haptic mode signal (HMS2) of second logic state for the electrostatic haptic effect. The first and second haptic mode signals (HMS1, HMS2) and the haptic data (Hdata) will be described later.

The driving signal supplying part 420 supplies the touch driving pulse (Tx_PWM) to the touch driving electrode (Tx1~Txn) on the basis of sensing start signal (PHT) and Tx channel setup signal supplied from the timing generating part 410. That is, the driving signal supplying part 420 selects a TX channel, to which the touch driving pulse (Tx_PWM) is to be output, in response to the TX channel setup signal of the timing generating part 410, generates the touch driving pulse (Tx_PWM) synchronized with the sensing start signal (PHT), and supplies the touch driving pulse (Tx_PWM) to the corresponding touch driving electrode (Tx1~Txn) through the driving routing line (Tx1~Txn) connected with the selected Tx channel. For example, in case of the touch point sensing mode or touch force sequential sensing mode, the driving signal supplying part 420 may sequentially supply the touch driving pulse (Tx_PWM) to the first to n-th touch driving electrodes (Tx1~Txn). In case of the touch force partial sensing mode, the driving signal supplying part 420 may sequentially supply the touch driving pulse (Tx_PWM) to the plurality of touch driving electrodes partially selected among the first to n-th touch driving electrodes (Tx1~Txn). The touch force partial sensing mode herein refers to a mode in which one or more touch driving electrodes (TX) are driven individually one at a time. In case of the touch force group sensing mode, the driving signal supplying part 420 may sequentially supply the touch driving pulse (Tx_PWM) to a plurality of touch driving electrode groups, wherein each group may include the two or more touch driving electrodes among the first to n-th touch driving electrodes (Tx1~Txn). The touch force group sensing mode herein refers to a mode in which touch driving electrodes (TX) in a group are driven simultaneously.

The driving signal supplying part 420 supplies an AC voltage (AC) to the touch driving electrode (Tx1~Txn) on the basis of haptic control signal (HCS) supplied from the timing generating part 410. That is, the driving signal supplying part 420 selects a TX channel, to which the AC voltage (AC) is to be output, in response to the haptic control signal (HCS) supplied from the timing generating part 410, and varies vibrating amplitude and period of the AC voltage (AC). Then, the driving signal supplying part 420 supplies the AC voltage (AC) to the corresponding touch driving electrode (Tx1~Txn) through the driving routing line connected with the selected Tx channel.

In response to the electrode connection signal (ECS) supplied from the timing generating part 410, the electrode connecting part 430 electrically floats the first and second dummy electrodes (Dxa, Dxb) in a unit of the first to m-th touch sensing electrode groups (Rx_G1~Rx_Gm) or electrically connects the first and second dummy electrodes (Dxa, Dxb) to the touch sensing electrode (Rx). For example, the electrode connecting part 430 electrically floats the first and second dummy routing lines (RL3, RL4) for each of the first to m-th touch sensing electrode groups (Rx_G1~Rx_Gm) in response to the electrode connection signal (ECS) in accordance with the touch point sensing mode, whereby the first and second dummy electrodes (Dxa, Dxb) are electrically floating in a unit of the first to m-th touch sensing electrode groups (Rx_G1~Rx_Gm). Also, the electrode connecting part 430 electrically connects the first and second dummy routing lines (RL3, RL4) to the sensing routing line (RL2) in a unit of the first to m-th touch sensing electrode groups (Rx_G1~Rx_Gm) in response to the electrode connection signal (ECS) in accordance with the touch force sequential sensing mode, the touch force partial sensing mode and the touch force group sensing mode. In response to the electrode connection signal (ECS) in accordance with the vibration haptic mode, the electrode connecting part 430 electrically connects the sensing routing line (RL2) and the first and second dummy routing lines (RL3, RL4) connected with each of the first to m-th touch sensing electrode groups (Rx_G1~Rx_Gm) included in the haptic area with a terminal of ground voltage, whereby the ground voltage (GND) is supplied to the touch sensing electrode (Rx) and the first and second dummy electrodes (Dxa, Dxb) for each of the first to m-th touch sensing electrode groups (Rx_G1~Rx_Gm) included in the haptic area. In response to the electrode connection signal (ECS) in accordance with the electrostatic haptic mode, the electrode connecting part 430 electrically connects the sensing routing line (RL2) and the first and second dummy routing lines (RL3, RL4) connected with each of the first to m-th touch sensing electrode groups (Rx_G1~Rx_Gm) included in the haptic area with a terminal of AC voltage, whereby the AC voltage (AC) is supplied to the touch sensing electrode (Rx) and the first and second dummy electrodes (Dxa, Dxb) for each of the first to m-th touch sensing electrode groups (Rx_G1~Rx_Gm) included in the haptic area.

Figure 11:
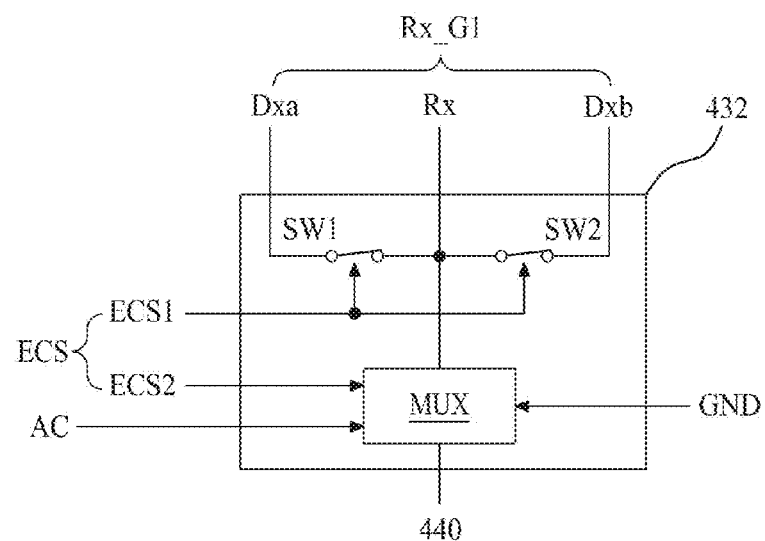
FIG. 11 illustrates an electrode connecting part of FIG. 10.

The electrode connecting part 430 according to an example of the present invention may include first to m-th switching circuits. In case of a first switching circuit 432 shown in FIG. 11, each of first to m-th switching circuits may include first and second switching devices (SW1, SW2) switched by the electrode connection signal (ECS), and a multiplexer (MUX). In this case, the electrode connection signal (ECS) may include first and second electrode connection signals (ECS1, ECS2).

As the first switching device (SW1) is turned-off by the first electrode connection signal (ECS1) of switching-off voltage supplied in accordance with the touch point sensing mode, the first dummy electrode (Dxa) is electrically floating. Also, the first switching device (SW1) is turned-on by the first electrode connection signal (ECS1) of switching-on voltage supplied in accordance with the touch force sensing mode or haptic mode, whereby the first dummy electrode (Dxa) is selectively connected with the touch sensing electrode (Rx).

As the second switching device (SW2) is turned-off by the first electrode connection signal (ECS1) of switching-off voltage supplied in accordance with the touch point sensing mode, the second dummy electrode (Dxb) is electrically floating. Also, the second switching device (SW2) is turned-on by the first electrode connection signal (ECS1) of switching-on voltage supplied in accordance with the touch force sensing mode or haptic mode, whereby the second dummy electrode (Dxb) is selectively connected with the touch sensing electrode (Rx).

The multiplexer (MUX) connects the touch sensing electrode (Rx) with the sensing part 440 by the second electrode connection signal (ECS) of first logic value supplied in accordance with the touch point sensing mode or touch force sensing mode, connects the touch sensing electrode (Rx) with the terminal of ground voltage (GND) by the second electrode connection signal (ECS2) of second logic value, and connects the touch sensing electrode (Rx) with the terminal of AC voltage (AC) by the second electrode connection signal (ECS) of third logic value.

Referring to FIGS. 9 and 10, the sensing part 440 generates a sensing signal obtained by sensing the change of charge amount in the touch sensor through the touch sensing electrode (Rx) for each of the first to m-th touch sensing electrode groups (Rx_G1~Rx_Gm) connected by the electrode connecting part 430 on the basis of sensing start signal (PHT) and Rx channel setup signal supplied from the timing generating part 410, and generates the touch point sensing data (Pdata) or touch force sensing data (Fdata) by an analog-to-digital conversion of the sensing signal. For example, in case of the touch point sensing mode, the sensing part 440 senses the change of charge amount in the touch sensor (Cm1, See FIG. 5B) through the touch sensing electrode (Rx) for each of the first to m-th touch sensing electrode groups (Rx_G1~Rx_Gm), and generates the touch point sensing data (Pdata) based on the change of charge amount. Also, in case of the touch force sequential sensing mode, touch force partial sensing mode and touch force group sensing mode, the sensing part 440 senses the change of charge amount in the touch sensor (Cm1, Cm2 and Cm3, See FIG. 5A) through the first and second dummy electrodes (Dxa, Dxb) and touch sensing electrode (Rx) for each of the first to m-th touch sensing electrode groups (Rx_G1~Rx_Gm), and generates the touch force sensing data (Fdata) based on the change of charge amount.

The sensing part 440 according to an example of the present invention may generate the sensing signal by amplifying a difference of the signals from the adjacent two Rx channels, and sampling the amplified signal. The sensing part 440 according to one embodiment of the present invention amplifies the difference between the signals of the adjacent two touch sensing electrodes and reduces noise ingredient input due to a parasitic capacitance of the touch panel 300, to thereby improve a signal-to-noise ratio. To this end, the sensing part 440 according to an example of the present invention may include an integrator comprising a differential amplifier.

The sensing part 440 according to another example of the present invention may compare a signal received from one Rx channel with a reference voltage, and may generate the sensing signal based on the comparison result. In this case, the sensing part 440 according to another embodiment of the present invention may include a comparator.

The sensing data processing part 450 receives the touch point sensing data (Pdada) or touch force sensing data (Fdata) from the sensing part 440, sequentially stores the received data in an internal memory, and transmits the touch point sensing data (Pdata) or touch force sensing data (Fdata) stored in the internal memory to the MCU of host system 600 in response to the touch report synchronization signal (TRSS) in accordance with a preset interface method.

The MCU of host system 600 receives the touch point sensing data (Pdata) from the sensing data processing part 450, compares the received touch point sensing data (Pdata) with a preset point sensing threshold value to determine whether or not there is a user's touch and the touch point coordinates by the use of touch point sensing data which is larger than the point sensing threshold value. That is, the MCU determines the touch point coordinates value (XY coordinates) based on point information (X-coordinate) of the touch sensing electrode (Rx) with the touch point sensing data (Pdata) and point information (Y-coordinate) of the touch driving electrode (Tx) being driven. In addition, the MCU may calculate the number of touch points from the calculated touch point coordinates, calculate the duration of a specific location being touched by counting the calculated number of touch points in a unit time period, or calculate a touch continuance time indicating a duration of a touch of the specific location in a unit time period.

Also, the MCU of host system 600 receives the touch force sensing data (Fdata) from the sensing data processing part 450, compares the received touch force sensing data (Fdata) with a preset force sensing threshold value, and calculates the touch point coordinates and a size of touch force by the use of touch force sensing data, if the touch force sensing data is larger than the force sensing threshold value. That is, the MCU calculates the touch force coordinates value (XY coordinates) based on point information (X-coordinate) of the touch sensing electrode (Rx) with the touch force sensing data (Fdata) and point information (Y-coordinate) of the touch driving electrode (Tx) being driven, and also calculates the size of touch force based on a size of the touch force sensing data (Fdata).

Additionally, the touch driving circuit 400 may comprise a touch MCU which calculates whether or not there is a user's touch, the touch point coordinates and the size of touch force by the use of touch point sensing data (Pdata) and/or touch force sensing data (Fdata), and transmits the calculated results to the MCU. In this case, the MCU of the host system 600 may only execute an application program linked to the touch point coordinates and the size of touch force provided from the touch MCU of host system 600.

Hereinafter, the haptic data (Hdata) and the haptic mode signal (HMS) output from the host system 600 will be described in detail.

The host system 600 may include a haptic control circuit 602, and the haptic control circuit 602 may be provided inside the MCU.

The haptic control circuit 602 sets the haptic area of the touch panel 300 based on a user's touch, and generates the haptic data and the haptic mode signal (HMS) for providing the various haptic effects such as the vibration haptic effect and the electrostatic haptic effect to a user. For example, the haptic control circuit 602 calculates the touch point in accordance with time based on the touch point sensing data (Pdata), generates a touch motion speed (i.e., a speed of change in a touch position from one location to another location on the touch panel) and haptic area based on the touch point in accordance with time, generates the first haptic mode signal (HMS1) for the vibration haptic mode or the second haptic mode signal (HMS2) for the electrostatic haptic mode on the basis of touch motion speed, and provides the generated results to the touch driving circuit 400. In addition, the haptic control circuit 602 calculates the touch force based on the touch force sensing data (Fdata), calculates a touch continuance time based on the touch point sensing data (Pdata), compares the touch continuance time with a reference time, and determines that it corresponds to a static touch or dynamic touch on the basis of comparison results. In one implementation, the haptic control circuit 602 applies a distance filter and/or a direction filter to determine whether the touch is the static touch or the dynamic touch. For example, if the change in the touch location is within a predetermined distance or a predetermined area for at least the reference time according to the distance filter, the touch is determined to be a static touch; otherwise the touch is determined to be a dynamic touch. For another example, if the direction of the change in the touch location is not consistent or random for at least the reference time according to the direction filter, the touch is determined to be a static touch; otherwise the touch is determined to be a dynamic touch. In case of the static touch, the haptic control circuit 602 generates the first haptic mode signal (HMS1), and generates first haptic data (Hdata) based on the touch force. In this case, the first haptic data (Hdata) may be a value being proportional to the intensity of touch force. Meanwhile, in case of the dynamic touch, the haptic control circuit 602 generates the second haptic mode signal (HMS2), and generates second haptic data (Hdata) based on the touch motion speed and the touch force. In this case, the second haptic data (Hdata) may be a value being proportional to the touch motion speed and the intensity of touch force.

Meanwhile, the vibration haptic effect corresponds to a mechanical vibration so that a user senses the vibration haptic effect even in a relatively-short touch. Meanwhile, it is difficult for a user to sense the electrostatic haptic effect in a relatively-short touch. Accordingly, the haptic control circuit 602 determines the haptic mode according to whether or not it is a temporary event touch corresponding to a user's single click or double click. That is, the haptic control circuit 602 determines whether or not it is the event touch on the basis of change of touch point or touch time. Based on the determination result, if it is the event touch, the haptic control circuit 602 generates the first haptic mode signal (HMS1) and third haptic data (Hdata), and provides the generated data and signal to the touch driving circuit 400. If it is not the event touch, the haptic control circuit 602 determines that it corresponds to the static touch or dynamic touch on the basis of touch motion speed, generates the first haptic data (Hdata) and first haptic mode signal (HMS1) or generates the second haptic data (Hdata) and second haptic mode signal (HMS2) on the basis of determination results, and provides the generated data and signal to the touch driving circuit 400.

The haptic control circuit 602 according to an example of the present invention may generate the third haptic data (Hdata) with a reference vibration value which is set without regard to the touch force. The haptic control circuit 602 according to another example of the present invention may generate the third haptic data (Hdata) with a vibration value according to the texture information of image based on the real-time image data analysis results for the haptic area. In this case, the haptic control circuit 602 may analyze the texture information of image in accordance with edge number information, color information, sharpness information and depth information for the haptic area. In one example, when an image of a brick is displayed and a portion of the touch panel on which the image of the brick is displayed is touched, the third haptic data (Hdata) is generated to apply the AC voltage (AC) with a corresponding frequency and amplitude representing a texture of the brick to electrodes associated with the location of the touch. The haptic control circuit 602 according to another example of the present invention may generate third haptic data (Hdata) with a vibration value according to haptic scenario on the basis of comparison result between the image of haptic area and the image of preset haptic scenario. In one example, when an image of an input pad (e.g., a keyboard) is displayed and a portion of the touch panel corresponding to the location of the input pad is touched, the third haptic data (Hdata) is generated to apply the AC voltage (AC) with a frequency and amplitude assigned for the input pad to electrodes associated with the location of touch.

The first and second haptic data (Hdata) may be set based on the texture information of image, the haptic scenario, or intensity of touch force. For example, the haptic control circuit 602 calculates texture data based on the texture information of image or the haptic scenario, corrects the texture data in accordance with the intensity of touch force, and generates the first or second haptic data (Hdata) based on the corrected texture data.

The aforementioned touch driving circuit 400 generates an AC voltage (AC) for the vibration haptic mode on the basis of the first haptic mode signal (HMS1) and the first or third haptic data (Hdata) provided from the haptic control circuit 602, and supplies the generated AC voltage for the vibration haptic mode to the touch driving electrode included in the haptic area. Also, the touch driving circuit 400 generates a first AC voltage (AC) and a second AC voltage (AC) for the electrostatic haptic mode on the basis of the second haptic mode signal (HMS2) and the second haptic data (Hdata) provided from the haptic control circuit 602, and for the electrostatic haptic mode supplies the generated first AC voltage to each touch sensing electrode group and the generated second AC voltage to the touch driving electrode included in the haptic area. In case of the electrostatic haptic mode, the second AC voltage (AC) applied to the touch driving electrode and the first AC voltage (AC) applied to the touch sensing electrode group may have phases synchronized with each other, or may have phases not synchronized with each other. In order to maximize the electrostatic haptic effect through the relatively-large electrostatic force, it is preferable that the AC voltage (AC) applied to the touch driving electrode and the AC voltage (AC) applied to the touch sensing electrode group in the electrostatic haptic mode have the phases synchronized with each other.

In one aspect, the AC voltage applied to the touch driving electrodes (TX) during the vibration haptic mode, the first AC voltage applied to the touch sensing electrodes (RX) during the electrostatic haptic mode, and the second AC voltage applied to the touch driving electrodes (TX) during the electrostatic haptic mode may have substantially equal amplitudes and/or frequencies.

In another aspect, the AC voltage applied to the touch driving electrodes (TX) during the vibration haptic mode, the first AC voltage applied to the touch sensing electrodes (RX) during the electrostatic haptic mode, and the second AC voltage applied to the touch driving electrodes (TX) during the electrostatic haptic mode may have different amplitudes and/or frequencies. In one example, the first AC voltage and the second AC voltage applied in the electrostatic haptic mode may have substantially equal frequencies and amplitudes which may be different from a frequency and an amplitude of the AC voltage applied during the vibration haptic mode. In another example, the first AC voltage and the second AC voltage applied in the electrostatic haptic mode may have substantially equal frequencies but different amplitudes.

Figure 12:
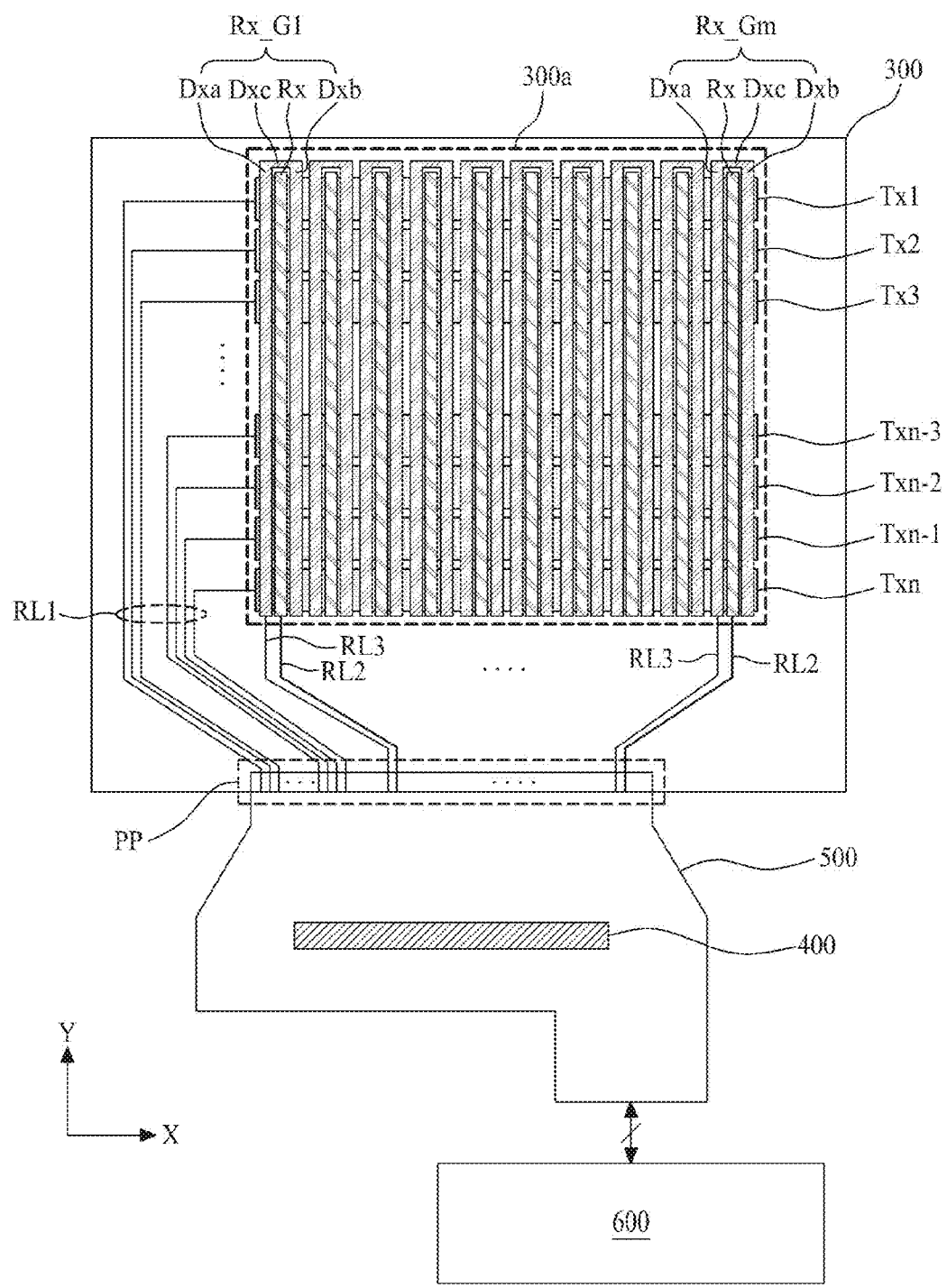
FIG. 12 illustrates a modified example of the touch panel in the apparatus for driving of touch panel according to one embodiment of the present invention.

In case of the apparatus for driving of touch panel according to one embodiment of the present invention, as shown in FIGS. 6 and 12, each of the first to m-th touch sensing electrode groups (Rx_G1~Rx_Gm) of the touch panel 300 may further include the dummy bridge electrode (Dxc) for electrically connecting one side of the first dummy electrode (Dxa) with one side of the second dummy electrode (Dxb). In this case, one side of the first dummy electrode (Dxa) is electrically connected with one side of the second dummy electrode (Dxb) through the dummy bridge electrode (Dxc) in a unit of the first to m-th touch sensing electrode groups (Rx_G1~Rx_Gm), whereby any one of the first and second dummy routing lines (RL3, RL4), for example, the second dummy routing line (RL4) may be omitted. Accordingly, the electrode connecting part 430 of the touch driving circuit 400 electrically floats the first dummy routing line (RL3) in response to the electrode connection signal (ECS) in accordance with the touch point sensing mode, whereby the electrode connecting part 430 electrically floats the first and second dummy electrodes (Dxa, Dxb) for each of the first to m-th touch sensing electrode groups (Rx_G1~Rx_Gm). The electrode connecting part 430 electrically connects the first dummy routing line (RL3) with the sensing routing line (RL2) in response to the electrode connection signal (ECS) in accordance with the touch force sequential sensing mode, the touch force partial sensing mode and the touch force group sensing mode, whereby the first and second dummy electrodes (Dxa, Dxb) are electrically connected with the corresponding touch sensing electrode (Rx) in a unit of the first to m-th touch sensing electrode groups (Rx_G1~Rx_Gm). Also, the electrode connecting part 430 electrically connects the first dummy routing line (RL3) and the sensing routing line (RL2) for each of the first to m-th touch sensing electrode groups (Rx_G1~Rx_Gm) included in the haptic area to the terminal of ground voltage (GND) or the terminal of AC voltage (AC) in response to the electrode connection signal (ECS) in accordance with the haptic mode.

Figure 13:
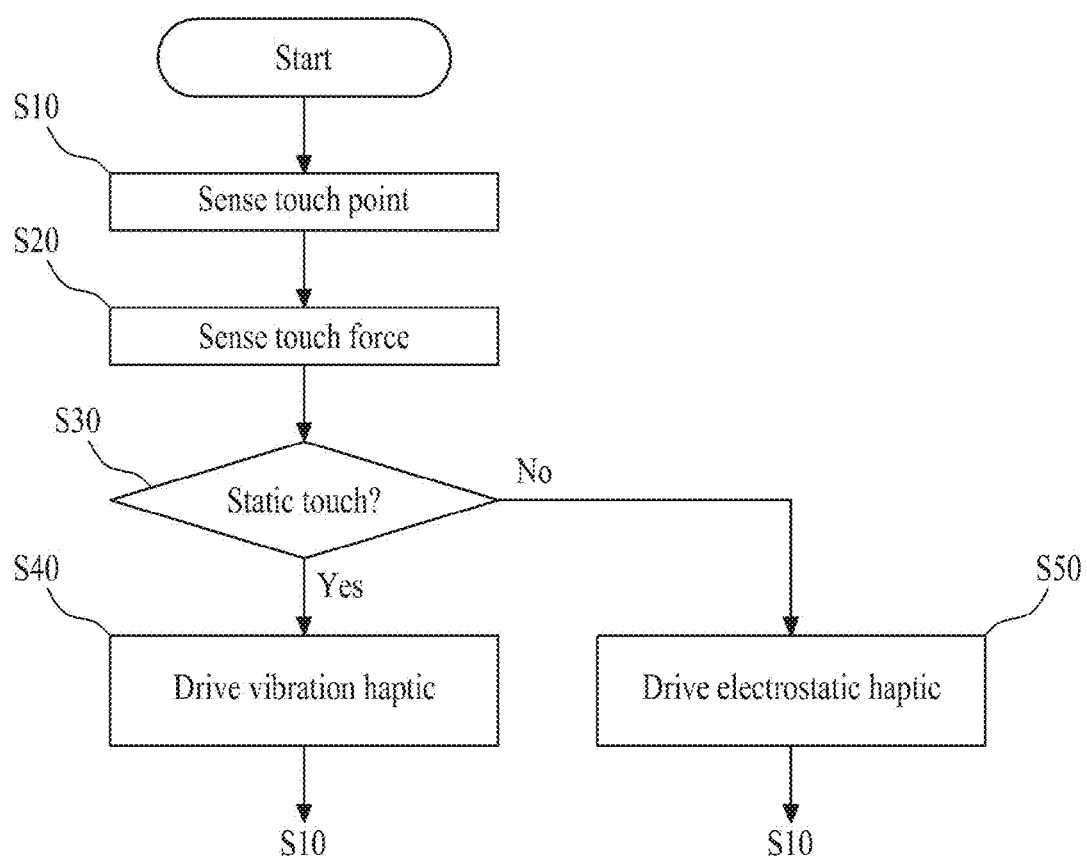
FIG. 13 is a flow chart of a method of driving the touch panel according to one embodiment of the present invention.

FIG. 13 is a flow chart for explaining a driving method of the touch panel according to one embodiment of the present invention.

A driving method of the touch panel according to one embodiment of the present invention will be described with reference to FIG. 13 in connection with FIGS. 9 and 10.

First, the user's touch point for the touch panel 300 is sensed (S10). That is, the touch driving circuit 400 electrically floats the first and second dummy electrodes (Dxa, Dxb) for each of the first to m-th touch sensing electrode groups (Rx_G1~Rx_Gm) in accordance with the touch point sensing mode, and then the touch driving circuit 400 sequentially supplies the touch driving pulse (Tx_PWM) to each of the first to n-th touch driving electrodes (Tx1~Txn), and simultaneously senses the change of charge amount in the first touch sensor (Cm1, See FIG. 5B) through the touch sensing electrode (Rx) for each of the first to m-th touch sensing electrode groups (Rx_G1~Rx_Gm), to thereby generate the touch point sensing data (Pdata) (S10).

Then, the touch force for the user's touch is sensed (S20). That is, the touch driving circuit 400 electrically connects the first and second dummy electrodes (Dxa, Dxb) to the touch sensing electrode (Rx) in a unit of the touch sensing electrode group (Rx_G1~Rx_Gm) in accordance with the touch force sensing mode, and then the touch driving circuit 400 sequentially supplies the touch driving pulse (Tx_PWM) to the touch driving electrode (Tx1~Txn), and senses the change of charge amount in the first to third touch sensors (Cm1, Cm2 and Cm3, See FIG. 5A) through the touch sensing electrode (Rx) for each of the first to m-th touch sensing electrode groups (Rx_G1~Rx_Gm), to thereby generate the touch force sensing data (Fdata) (S20). In this case, the touch driving circuit 400 may supply the touch driving pulse (Tx_PWM) to the touch driving electrode included in the touch point area based on the touch point sensing data (Pdata), and sense the change of charge amount of the touch sensing electrode (Rx) of the touch sensing electrode group included in the touch point area, to thereby generate the touch force sensing data (Fdata).

Thereafter, it is determined whether or not the user's touch is the static touch (S30). That is, the haptic control circuit 602 determines the touch point in accordance with time based on the touch point sensing data (Pdata), determines the touch motion speed and the haptic area based on the touch point in accordance with time, and determines whether the touch is the static touch or dynamic touch on the basis of touch motion speed.

Based on the determination result of S30, if it is the static touch ('Yes' of S30), the touch sensing electrode group and the touch driving electrode included in the haptic area are selected, and the vibration haptic is formed in the haptic area by the vibration haptic driving of applying an AC voltage (AC) based on the touch force to the selected touch driving electrode, and applying the ground voltage (GND) to the selected touch sensing electrode group (S40).

Meanwhile, if it is the dynamic touch ('No' of S30), the touch sensing electrode group and the touch driving electrode included in the haptic area are selected, and the electrostatic haptic is formed in the haptic area by the electrostatic haptic driving of applying a second AC voltage (AC) to the selected touch driving electrode, and applying a first AC voltage (AC) to each of the touch sensing electrode groups (S50) based on the touch motion speed and the touch force.

Figure 14:
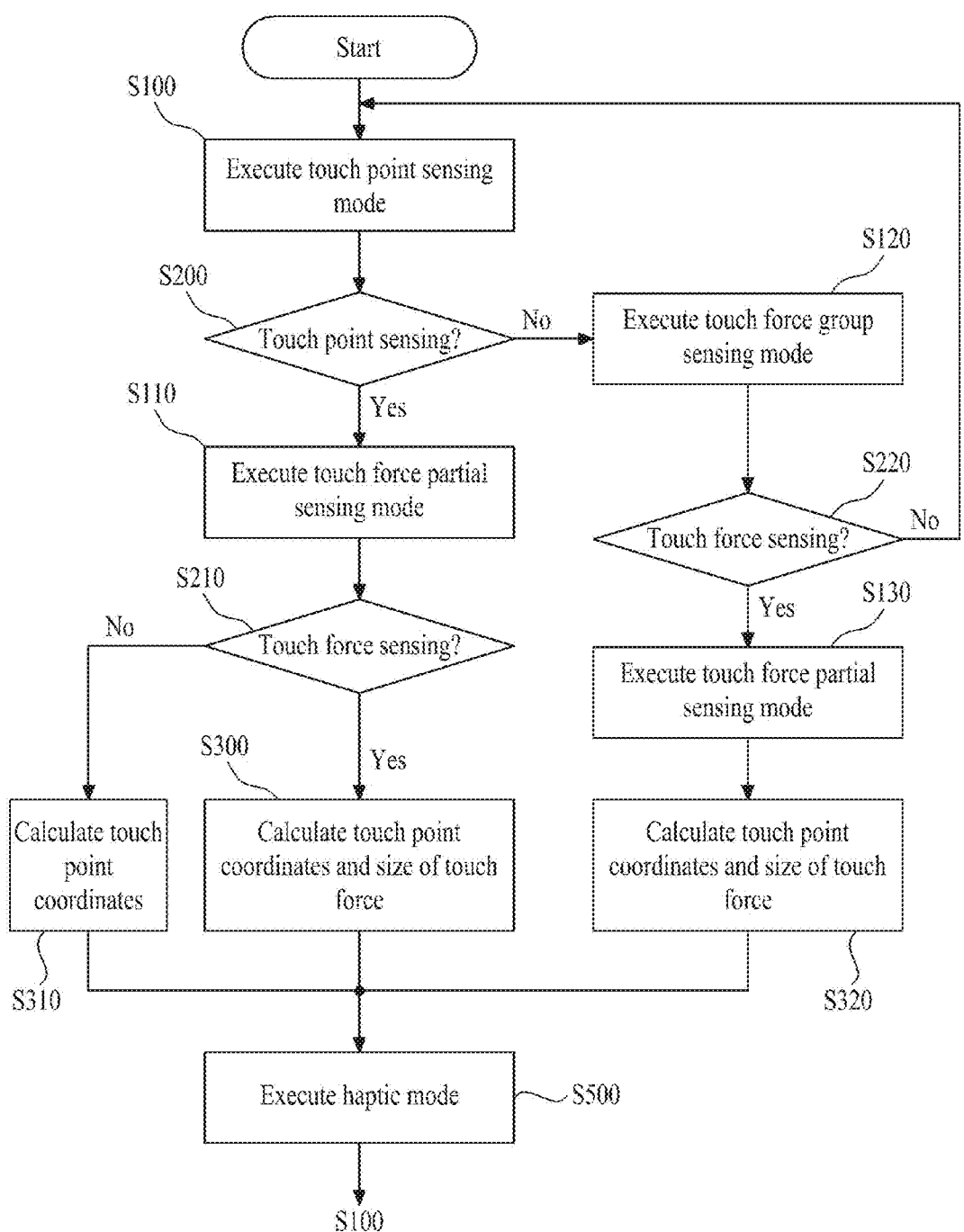
FIG. 14 is a flow chart of another method of driving the touch panel according to one embodiment of the present invention.

FIG. 14 is a flow chart for explaining a driving method of the touch panel according to one embodiment of the present invention.

A driving method of the touch panel according to one embodiment of the present invention will be described with reference to FIG. 14 in connection with FIGS. 9 and 10.

First, the touch driving circuit 400 electrically floats the first and second dummy electrodes (Dxa, Dxb) for each of the first to m-th touch sensing electrode groups (Rx_G1~Rx_Gm) in accordance with the touch point sensing mode, and then the touch driving circuit 400 sequentially supplies the touch driving pulse (Tx_PWM) to each of the first to n-th touch driving electrodes (Tx1~Txn), and simultaneously senses the change of charge amount in the first touch sensor (Cm1, See FIG. 5B) through the touch sensing electrode (Rx) for each of the first to m-th touch sensing electrode groups (Rx_G1~Rx_Gm), to thereby generate the touch point sensing data (Pdata) (S100).

In the touch point sensing mode, the MCU determines whether or not there is the touch point sensing on the basis of preset point sensing threshold value and touch point sensing data (Pdata) supplied from the touch driving circuit 400 (S200). Based on the determination result, if there is the touch point sensing ('Yes' of S200), if there is the touch point sensing ('Yes' of S200), touch point area information is generated, and the touch force partial sensing mode signal is generated and is supplied to the touch driving circuit 400. Thereafter, after the touch driving circuit 400 electrically connects the first and second dummy electrodes (Dxa, Dxb) to the touch sensing electrode (Rx) in a unit of the touch sensing electrode group (Rx_G1~Rx_Gm) corresponding to the touch point area information in response to the touch force partial sensing mode signal and the touch point area information supplied from the MCU, the touch driving circuit 400 sequentially supplies the touch driving pulse (Tx_PWM) to one or more of the touch driving electrode (Tx1~Txn) corresponding to the touch point area information individually one at a time, and simultaneously senses the change of charge amount in the first to third touch sensors (Cm1, Cm2 and Cm3, See FIG. 5A) through the touch sensing electrode (Rx) of the corresponding touch sensing electrode group (Rx_G1~Rx_Gm), to thereby generate the touch force sensing data (Fdata) (S110).

In the touch force partial sensing mode, the MCU determines whether or not there is the touch force sensing on the basis of touch force sensing data (Fdata) and preset force sensing threshold value (S210). Based on the determination result, if there is the touch force sensing ('Yes' of S210) by the touch force sensing data (Fdata), the touch point coordinates based on the touch point sensing data (Pdata) and the size of touch force based on the touch force sensing data (Fdata) are calculated and are supplied to the host system 600 (S300). Meanwhile, if there is no touch force sensing ('No' of S210) by the touch force sensing data (Fdata), the touch point coordinates based on the touch point sensing data (Pdata) generated by the prior touch point sensing mode is calculated and is provided to the host system 600 (S310).

Based on the determination result of S200, if the MCU determines that there is no touch point sensing ('No' of S200), the touch force group sensing mode signal for checking whether or not there is a non-conductive touch using a touch pen instead of a user's finger is generated and is provided to the touch driving circuit 400. After the touch driving circuit 400 electrically connects the first and second dummy electrodes (Dxa, Dxb) to the touch sensing electrode (Rx) in a unit of the first to m-th touch sensing electrode groups (Rx_G1~Rx_Gm) in response to the touch force group sensing mode signal supplied from the MCU, the touch driving circuit 400 sequentially supplies the touch driving pulse (Tx_PWM) to the plurality of touch driving electrode groups, wherein each touch driving electrode group comprises the two or more touch driving electrodes that are supplied with the touch driving pulse simultaneously, and senses the change of charge amount in the first to third touch sensors (Cm1, Cm2 and Cm3, See FIG. 5A) through the touch sensing electrode (Rx) of the corresponding touch sensing electrode group (Rx_G1~Rx_Gm), to thereby generate the touch force sensing data (Fdata) (S120).

In the touch force group sensing mode, the MCU determines whether or not there is the touch force sensing on the basis of touch force data (Fdata) and force sensing threshold value (S220). Based on the determination result, if there is the touch force sensing ('Yes' of S220) by the touch force sensing data (Fdata), touch force area information based on the touch force sensing data (Fdata) is generated, and the touch force partial sensing mode signal is generated and supplied to the touch driving circuit 400. After the touch driving circuit 400 electrically connects the first and second dummy electrodes (Dxa, Dxb) to the touch sensing electrode (Rx) in a unit of the touch sensing electrode group (Rx_G1 Rx_Gm) corresponding to the touch force area information in response to the touch force partial sensing mode signal and the touch force area information supplied from the MCU, the touch driving circuit 400 sequentially supplies the touch driving pulse (Tx_PWM) to the touch driving electrode (Tx1~Txn) corresponding to the touch force area information individually one at a time, and senses the change of charge amount in the first to third touch sensors (Cm1, Cm2 and Cm3, See FIG. 5A) through the touch sensing electrode (Rx) of the corresponding touch sensing electrode group (Rx_G1~Rx_Gm), to thereby generate the touch force sensing data (Fdata) (S130).

In the touch force partial sensing mode, the MCU calculates the touch point coordinates and the size of touch force, if touch force sensing data (Fdata) supplied from the touch driving circuit 400 is larger than the preset force sensing threshold value, and provides the calculated touch point coordinates and the size of touch force to the host system 600 (S320).

Based on the determination result of S220, if the MCU determines that there is no touch force sensing ('No' of S220), the MCU generates the touch point sensing mode signal for the touch point sensing mode of S100, and supplies the generated signal to the touch driving circuit 400.

Then, the vibration haptic mode or electrostatic haptic mode is selectively executed in accordance with the touch point sensing data (Pdata) and the touch force sensing data (Fdata) of S300, the touch point sensing data (Pdata) of S310, or the touch force sensing data (Fdata) and the touch point sensing data (Pdata) of S310, whereby the vibration haptic or electrostatic haptic is formed in the haptic area, and the haptic effect is provided to a user (S500).

Figure 15:
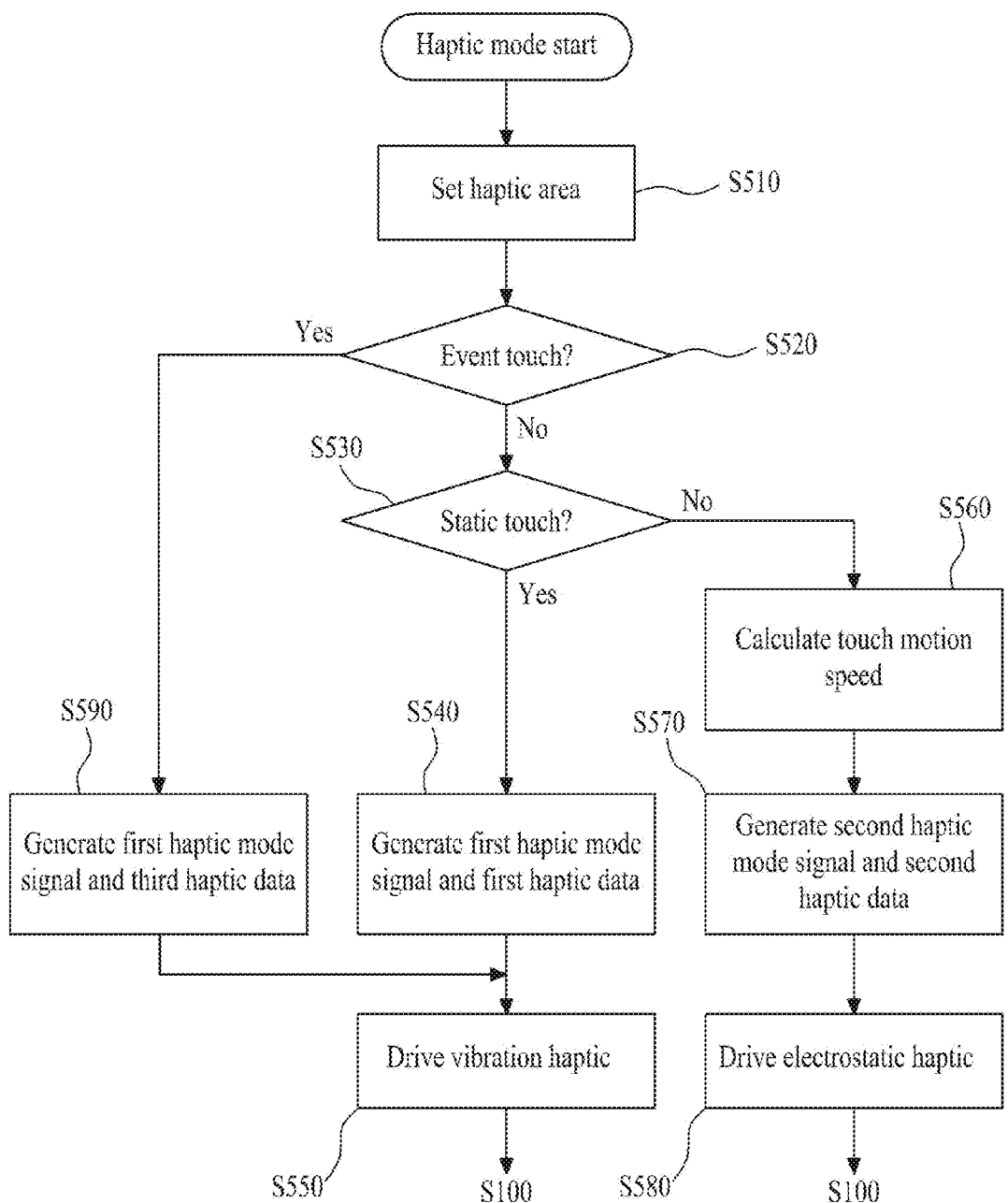
FIG. 15 is a flow chart of a method of driving the touch panel in a haptic mode of FIG. 14, according to one embodiment.

FIG. 15 is a flow chart for explaining the haptic mode shown in FIG. 14.

A haptic driving method in the driving method of the touch panel according to one embodiment of the present invention will be described with reference to FIG. 15 in connection with FIGS. 9 and 10.

First, the haptic control circuit 602 of the host system 600 calculates the touch point in accordance with time based on the aforementioned touch point sensing data (Pdata), and sets the haptic area based on the touch point in accordance with time (S510).

Then, it is determined whether or not the user's touch is the event touch on the basis of the touch point in accordance with time or the touch continuance time calculated based on the touch point sensing data (Pdata) (S520). In one example, if the touch continuance time is less than a predetermined time, the user's touch is determined to be the event touch. If the touch continuance time is equal to greater than the predetermined time, the user's touch is determined to be either a static touch or a dynamic touch in step S530.

Based on the determination result (S520), if it is not the event touch ('No' of S520), the haptic control circuit 602 compares the touch continuance time with the reference time, whereby it is determined that it is the static touch or dynamic touch (S530). Based on the determination result (S530), if the user's touch is the static touch without motion ('Yes' of S530), the haptic control circuit 602 generates the first haptic mode signal (HMS1) and generates the first haptic data (Hdata) based on the touch force in accordance with the touch force sensing data (Fdata) (S540), and provides the generated signal and data and the haptic area to the touch driving circuit 400. Accordingly, the touch driving circuit 400 generates the AC voltage (AC) corresponding to the first haptic data (Hdata) in accordance with the first haptic mode signal (HMS1), and forms the vibration in the haptic area by applying the ground voltage (GND) to the electrodes for each of the touch sensing electrode groups included in the haptic area and applying the AC voltage (AC) to the touch driving electrode in the haptic area, as shown in FIG. 5C, to thereby provide the tactile information in accordance with the vibration haptic effect to a user (S550).

Based on the determination result (S530), if the user's touch is the dynamic touch with motion ('No' of S530), the haptic control circuit 602 calculates the touch motion speed based on the touch point in accordance with time (S560), generates the second haptic data (Hdata) based on the touch motion speed and the touch force in accordance with the touch force sensing data (Fdata) (S570), and provides the calculated touch motion speed, the generated data and the haptic area to the touch driving circuit 400. Accordingly, the touch driving circuit 400 generates the first AC voltage (AC) and the second AC voltage (AC) corresponding to the second haptic data (Hdata) in accordance with the second haptic mode signal (HMS2), and forms the electrostatic force in the haptic area by applying the first AC voltage (AC) to the electrodes for each of the touch sensing electrode groups included in the haptic area and applying the second AC voltage (AC) to the touch driving electrode included in the haptic area, as shown in FIG. 5D, to thereby provide the texture information in accordance with the electrostatic haptic effect to a user (S580).

Based on the determination result for the event touch (S520), if the user's touch is the event touch ('Yes' of S520), the haptic control circuit 602 generates the first haptic mode signal (HMS1) and generates the previously-set third haptic data (Hdata) (S590), and provides the first haptic mode signal (HMS1), the third haptic data (Hdata) and the haptic area to the touch driving circuit 400. Accordingly, the touch driving circuit 400 generates the AC voltage corresponding to the third haptic data (Hdata) in accordance with the first haptic mode signal (HMS1), and forms the vibration in the haptic area by applying the AC voltage (AC) to the touch driving electrode included in the haptic area, and applying the ground voltage (GND) to the electrodes for each of the touch sensing electrode groups included in the haptic area, as shown in FIG. 5C, to thereby provide the tactile information in accordance with the vibration haptic effect to a user (S550).

For the touch point sensing, the first and second dummy electrodes (Dxa, Dxb) are electrically floating, and then the touch point sensing mode is carried out so that it is possible to improve the efficiency for the touch point sensing. For the touch force sensing, the area of the sensing electrode is increased by electrically connecting the first and second dummy electrodes (Dxa, Dxb) with the touch sensing electrode (Rx), and then the touch force sensing mode is carried out so that it is possible to improve the efficiency for the touch force sensing. Specifically, the touch point sensing and the touch force sensing are carried out in the time division driving method, wherein the touch force sensing is carried out dividedly by the touch force group sensing and the touch force partial sensing, whereby it is possible to overcome a problem of the increase in touch driving time caused by the time division driving method. Also, both the touch point and the touch force are sensed by the use of elastic dielectric member 130, and moreover, the elastic dielectric member 130 enables the haptic function without the additional haptic output apparatus. Specifically, the haptic mode is driven in the vibration haptic mode or electrostatic haptic mode in accordance with the user's event touch, static touch or dynamic touch so that it is possible to effectively provide the various haptic effects to a user.

According to the embodiments of the present invention, the elastic dielectric member for the touch point sensing and the touch force sensing is used as the haptic output apparatus so that it is possible to realize the haptic function without the additional haptic output apparatus.

Also, the haptic mode is driven in the vibration haptic mode or electrostatic haptic mode in accordance with the user's event touch, static touch or dynamic touch so that it is possible to effectively provide the various haptic effects to a user.

Furthermore, the area of the touch sensing electrode overlapped with the touch driving electrode is adjusted in accordance with the touch point sensing and the touch force sensing so that it is possible to improve both touch point sensing efficiency and touch force sensing efficiency.

Also, even though the time division driving method is used for the touch point sensing and the touch force sensing, the partial sensing or group sensing is selectively carried out so that it is possible to overcome the problem of the increase in touch driving time caused by the time division driving method.

It will be apparent to those skilled in the art that various modifications and variations can be made to embodiments of the present invention without departing from the spirit or scope of the invention. Thus, it is intended that the present invention covers the modifications and variations of this invention provided they come within the scope of the appended claims and their equivalents.

What is claimed is:
1. A touch panel comprising:
 first electrodes;
 second electrodes separated from and intersecting the first electrodes, the second electrodes including a plurality of electrodes and adjacent electrodes, each of the plurality of electrodes disposed between a corresponding one of the adjacent electrodes and another corresponding one of the adjacent electrodes adjacent to said each of the plurality of electrodes;

bridge electrodes, each of the bridge electrodes directly connected to one end of the corresponding one of the adjacent electrodes and one end of said another corresponding one of the adjacent electrodes, the bridge electrodes physically disconnected from the plurality of electrodes; and an elastic dielectric member disposed between the first electrodes and the second electrodes to separate the first electrodes and the second electrodes, wherein during a first haptic mode, a first voltage is applied to the first electrodes and a reference voltage is applied to the second electrodes to vibrate the elastic dielectric member, and wherein during a second haptic mode, (i) a second voltage is applied to one or more of the second electrodes to generate electrostatic force between the one or more of the second electrodes and a user's finger and (ii) a third voltage is applied to the first electrodes to generate additional electrostatic force between the first electrodes and the user's finger through the elastic dielectric member for providing electrostatic haptic effect to the user's finger.

2. The touch panel of claim 1, wherein the first electrodes are applied with a touch driving pulse during a first sensing mode and a second sensing mode; and wherein a first touch sense signal responsive to the touch driving pulse on the second electrodes is sensed in the first sensing mode, and a second touch sense signal responsive to the touch driving pulse on a subset of the second electrodes is sensed in the second sensing mode.

3. The touch panel of claim 2, wherein the plurality of electrodes comprise touch sensing electrodes, and wherein the subset of the second electrodes includes the touch sensing electrodes but excludes the adjacent electrodes.

4. The touch panel of claim 3, wherein:

in the first sensing mode, the first touch sense signal from at least one of the touch sensing electrodes and one or more of the adjacent electrodes adjacent to said one of the touch sensing electrodes is sensed to determine a force of the touch on the touch panel, and in the second sensing mode, the second touch sense signal from said one of the touch sensing electrodes but excluding the adjacent electrodes adjacent to said one of the touch sensing electrodes is sensed to determine a location of the touch on the touch panel.

5. The touch panel of claim 4, wherein, in the second sensing mode, the second touch sense signal from said one of the touch sensing electrodes but excluding the adjacent electrodes adjacent to said one of the touch sensing electrodes is further sensed to determine whether the touch corresponds to a user's single click or double click.

6. The touch panel of claim 5, wherein, responsive to determining the touch corresponds to the user's single click or double click, the first voltage applied to the first electrodes during the first haptic mode is generated regardless of the force of the touch, and wherein, responsive to determining the touch does not correspond to the user's single click or double click, the first voltage applied to the first electrodes during the first haptic mode or the second voltage applied to the one or more of the second electrodes during the second haptic mode is generated based on the determined force of the touch.

7. The touch panel of claim 4, wherein, responsive to determining the touch corresponds to a static touch, the first voltage applied to the first electrodes during the first haptic mode is generated based on the determined force of the touch.

8. The touch panel of claim 4, wherein, responsive to determining the touch corresponds to a dynamic touch, the second voltage applied to the one or more of the second electrodes during the second haptic mode is generated based on the determined force of the touch and a touch motion speed.

9. The touch panel of claim 1, wherein the touch sensing electrodes, the adjacent electrodes, and the bridge electrodes are disposed on a same layer.

10. A method of operating a touch panel including first electrodes, second electrodes separated from and intersecting the first electrodes, bridge electrodes, and an elastic dielectric member disposed between the first electrodes and the second electrodes to separate the first electrodes and the second electrodes, the second electrodes including a plurality of electrodes and adjacent electrodes, each of the plurality of electrodes disposed between a corresponding one of the adjacent electrodes and another corresponding one of the adjacent electrodes adjacent to said each of the plurality of electrodes, each of the bridge electrodes directly connected to one end of the corresponding one of the adjacent electrodes and one end of said another corresponding one of the adjacent electrodes, the bridge electrodes physically disconnected from the plurality of electrodes, the method comprising:

applying, during a first haptic mode, a first voltage to one of the first electrodes and a reference voltage to one of the second electrodes to vibrate the elastic dielectric member; and applying, during a second haptic mode, (i) a second voltage to one of the plurality of electrodes through a routing line coupled to the one of the plurality of electrodes, (ii) the second voltage to a first adjacent electrode of the adjacent electrodes adjacent to the one of the plurality of electrodes through another routing line coupled to the first adjacent electrode, and (iii) the second voltage to a second adjacent electrode of the adjacent electrodes adjacent to the one of the plurality of electrodes indirectly through the first adjacent electrode and a bridge electrode of the bridge electrodes directly connected between the first adjacent electrode and the second adjacent electrode to generate electrostatic force between the one or more of the second electrodes and a user's finger.

11. The method of claim 10, wherein the first voltage applied to the first electrodes during the first haptic mode is a sine wave or a square wave at a frequency.

12. The method of claim 10, further comprising:

applying a touch driving pulse to the first electrodes during a first sensing mode and a second sensing mode;

sensing, in the first sensing mode, a first touch sense signal responsive to the touch driving pulse on the second electrodes; and sensing, in the second sensing mode, a second touch sense signal responsive to the touch driving pulse on a subset of the second electrodes.

13. The method of claim 12, wherein the plurality of electrodes comprise touch sensing electrodes, and wherein the subset of the second electrodes includes the touch sensing electrodes but excludes the adjacent electrodes.

14. The method of claim 13, wherein:
in the first sensing mode, the first touch sense signal from at least one of the touch sensing electrodes and one or more of the adjacent electrodes adjacent to said one of the touch sensing electrodes is sensed to determine a force of the touch on the touch panel, and
in the second sensing mode, the second touch sense signal from said one of the touch sensing electrodes but excluding the adjacent electrodes adjacent to said one of the touch sensing electrodes is sensed to determine a location of the touch on the touch panel.

15. The method of claim 14, further comprising:
determining whether the touch corresponds to a user's single click or double click.

16. The method of claim 15,
wherein, responsive to determining the touch corresponds to the user's single click or double click, the first voltage applied to the first electrodes during the first haptic mode is generated regardless of the determined force of the touch, and
wherein, responsive to determining the touch does not correspond to the user's single click or double click, the first voltage applied to the first electrodes during the first haptic mode or the second voltage applied to the one or more of the second electrodes during the second haptic is generated based on the determined force of the touch.

17. The method of claim 14, wherein, responsive to determining the touch corresponds to a static touch, the first voltage applied to the first electrodes during the first haptic mode is generated based on the determined force of the touch.

18. The method of claim 14, wherein, responsive to determining the touch corresponds to a dynamic touch, the second voltage applied to the one or more of the second electrodes during the second haptic mode is generated based on the determined force of the touch and a touch motion speed.

19. A touch panel comprising:
first electrodes;
second electrodes separated from and intersecting the first electrodes, the second electrodes including a plurality of electrodes and adjacent electrodes, each of the plurality of electrodes disposed between a corresponding one of the adjacent electrodes and another corresponding one of the adjacent electrodes adjacent to said each of the plurality of electrodes;
bridge electrodes, each of the bridge electrodes directly connected to one end of the corresponding one of the adjacent electrodes and one end of said another corresponding one of the adjacent electrodes, the bridge electrodes physically disconnected from the plurality of electrodes, the plurality of electrodes, the adjacent electrodes and the bridge electrodes disposed on a same layer; and
an elastic dielectric member disposed between the first electrodes and the second electrodes to separate the first electrodes and the second electrodes,
wherein during a first haptic mode, a first voltage is applied to the first electrodes and a reference voltage is applied to the second electrodes to vibrate the elastic dielectric member, and
wherein during a second haptic mode, a second voltage is applied to one or more of the plurality of electrodes and the adjacent electrodes to generate electrostatic force between (i) the one or more of the plurality of electrodes and the adjacent electrodes and (ii) a user's finger.

20. The touch panel of claim 19, further comprising:
a touch driving circuit configured to:
apply the first voltage to the first electrodes and the reference voltage to the second electrodes during the first haptic mode to vibrate the elastic dielectric member, and
apply the second voltage to the one or more of the plurality of electrodes and the adjacent electrodes during the second haptic mode to generate the electrostatic force.

21. The touch panel of claim 20, further comprising:
routing lines comprising a first plurality of routing lines and a second plurality of routing lines, each of the first plurality of routing lines coupled between a corresponding one of the plurality of electrodes and the touch driving circuit, each of the second plurality of routing lines coupled to the corresponding one of the adjacent electrodes and indirectly coupled to said another corresponding one of the adjacent electrodes through the corresponding one of the adjacent electrodes and a corresponding bridge electrode of the bridge electrodes.

* * * * *